US006822553B1

(12) United States Patent
Henderson et al.

(10) Patent No.: US 6,822,553 B1

(45) Date of Patent: Nov. 23, 2004

(54) SECURE ENTRY SYSTEM WITH RADIO REPROGRAMMING

(75) Inventors: Walter G. Henderson, Salem, OR (US); Wayne F. Larson, Salem, OR (US); Philip D. Barrett, Salem, OR (US)

(73) Assignee: GE Interlogix, Inc., Salem, OR (US)

(*) Notice: Subject to any disclaimer, the term of this patent is extended or adjusted under 35 U.S.C. 154(b) by 1826 days.

(21) Appl. No.: 08/138,555

(22) Filed: Oct. 15, 1993

Related U.S. Application Data

(63) Continuation of application No. 07/864,958, filed on Apr. 7, 1992, now abandoned, which is a division of application No. 07/806,801, filed on Dec. 5, 1991, now Pat. No. 5,245,652, which is a continuation of application No. 07/640,255, filed on Jan. 11, 1991, now abandoned, which is a division of application No. 07/303,711, filed on Jan. 27, 1989, now Pat. No. 4,988,987, which is a continuation-in-part of application No. 07/192,853, filed on May 11, 1988, now abandoned, which is a division of application No. 07/015,864, filed on Feb. 17, 1987, now Pat. No. 4,766,746, which is a continuation-in-part of application No. 06/831,601, filed on Feb. 21, 1986, now Pat. No. 4,727,368, which is a continuation-in-part of application No. 06/814,364, filed on Dec. 30, 1985, now abandoned, which is a continuation-in-part of application No. 06/788,072, filed on Oct. 16, 1985, now abandoned.

(51) Int. Cl.[7] .................. H04Q 1/00

(52) U.S. Cl. .................. 340/5.73; 70/278

(58) Field of Search .................. 340/825.31, 825.34, 340/825.69, 825.72, 5.73; 235/382.5; 70/278; 455/269, 343; 379/98, 103, 105, 108, 107

(56) References Cited

U.S. PATENT DOCUMENTS

| | | | | | |
|---|---|---|---|---|---|
| 3,337,992 | A | * | 8/1967 | Tolson | 340/533 |
| 3,812,403 | A | * | 5/1974 | Gartner | 340/825.31 |
| 4,157,534 | A | * | 6/1979 | Schachter | 340/825.31 |
| 4,209,782 | A | * | 6/1980 | Donath | 70/278 |
| 4,218,690 | A | * | 8/1980 | Ulch | 340/825.31 |
| 4,236,068 | A | * | 11/1980 | Walton | 379/103 |
| 4,275,385 | A | | 6/1981 | White | 340/312 |
| 4,415,893 | A | * | 11/1983 | Roland | 340/825.31 |
| 4,469,917 | A | * | 9/1984 | Shelley | 379/107 |
| 4,491,843 | A | * | 1/1985 | Boubouleix | 455/269 |
| 4,525,865 | A | | 7/1985 | Mears | 455/186 |
| 4,531,237 | A | * | 7/1985 | Bar-on et al. | 455/343 |
| 4,543,955 | A | | 10/1985 | Schroeppel | 128/635 |
| 4,596,985 | A | | 6/1986 | Bongard et al. | |
| 4,600,829 | A | * | 7/1986 | Walton | 340/825.34 |
| 4,609,780 | A | | 9/1986 | Clark | 179/2 A |
| 4,713,661 | A | | 12/1987 | Boone et al. | 340/994 |

(List continued on next page.)

FOREIGN PATENT DOCUMENTS

| | | | | |
|---|---|---|---|---|
| EP | 307 485 | | 3/1989 | |
| EP | 393784 | | 10/1990 | |
| FR | 2542792 | | 3/1983 | |
| FR | 2604808 | | 10/1986 | |
| GB | 2144249 | * | 2/1985 | 340/825.31 |
| WO | WO 90/13096 | | 4/1989 | |
| WO | WO 91/18169 | | 5/1991 | |
| WO | WO 91/20026 | | 6/1991 | |

OTHER PUBLICATIONS

"Websters New World Dictionary" p. 1108 Definition of [Radio Frequency].*

Marino, "Pager and Garage Door Opener Combination," Motorola Technical Developments, vol. 10, Mar., 1990.

*Primary Examiner*—Brian Zimmerman

(74) *Attorney, Agent, or Firm*—Klarquist Sparkman, LLP

(57) ABSTRACT

One or more lock or key units of a secure entry system is equipped with a radio receiver. The receiver permits a memory in the lock or key unit to be updated with new data that is modulated onto a radio frequency signal. By this technique, system-wide changes of programming data, such as changes of lockout lists and access codes, and changes targeted to specific units, such as disabling a particular key, can be implemented simply and quickly.

1 Claim, 13 Drawing Sheets

U.S. PATENT DOCUMENTS

| | | | | | |
|---|---|---|---|---|---|
| 4,713,808 | A | | 12/1987 | Gaskill et al. | 370/94 |
| 4,721,954 | A | * | 1/1988 | Mauch | 340/825.31 |
| 4,727,368 | A | | 2/1988 | Larson et al. | 340/825.31 |
| 4,727,369 | A | * | 2/1988 | Rode et al. | 340/825.31 |
| 4,760,393 | A | * | 7/1988 | Mauch | 340/825.31 |
| 4,766,746 | A | | 8/1988 | Henderson et al. | 70/63 |
| 4,777,556 | A | | 10/1988 | Imran | 361/155 |
| 4,800,255 | A | | 1/1989 | Imran | 235/382 |
| 4,829,296 | A | * | 5/1989 | Clark | 340/825.31 |
| 4,831,374 | A | * | 5/1989 | Masel | 340/825.31 |
| 4,851,652 | A | | 7/1989 | Imran | 235/382 |
| 4,864,115 | A | | 9/1989 | Imran et al. | 235/492 |
| 4,910,510 | A | | 3/1990 | Davis et al. | 340/825.44 |
| 4,931,789 | A | | 6/1990 | Pinnow | |
| 4,958,632 | A | | 9/1990 | Duggan | 128/419 PG |
| 4,962,449 | A | * | 10/1990 | Schlesinger | 340/825.31 |
| 4,962,522 | A | | 10/1990 | Marian | 379/5 |
| 5,014,049 | A | * | 5/1991 | Bosley | 340/825.31 |
| 5,016,273 | A | | 5/1991 | Hoff | 380/10 |
| 5,020,135 | A | | 5/1991 | Kasparian et al. | 455/76 |
| 5,113,427 | A | | 5/1992 | Ryoichi et al. | 340/825.44 |
| 5,124,696 | A | | 6/1992 | Bosley | |
| 5,237,264 | A | * | 8/1993 | Moseley et al. | 340/825.69 |

* cited by examiner

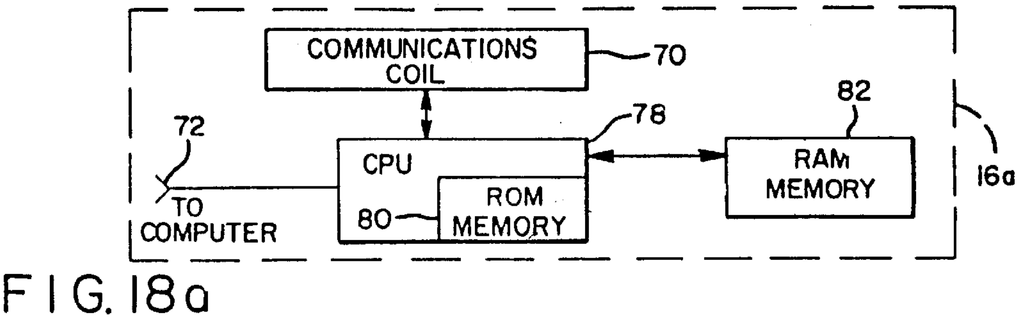
FIG. 18a
FIG. 18b
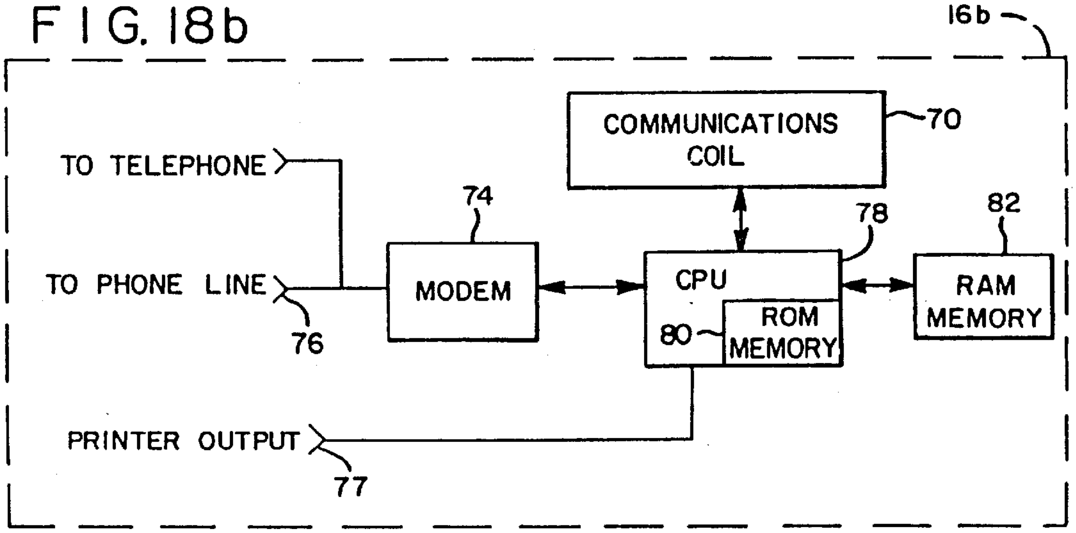
FIG. 21
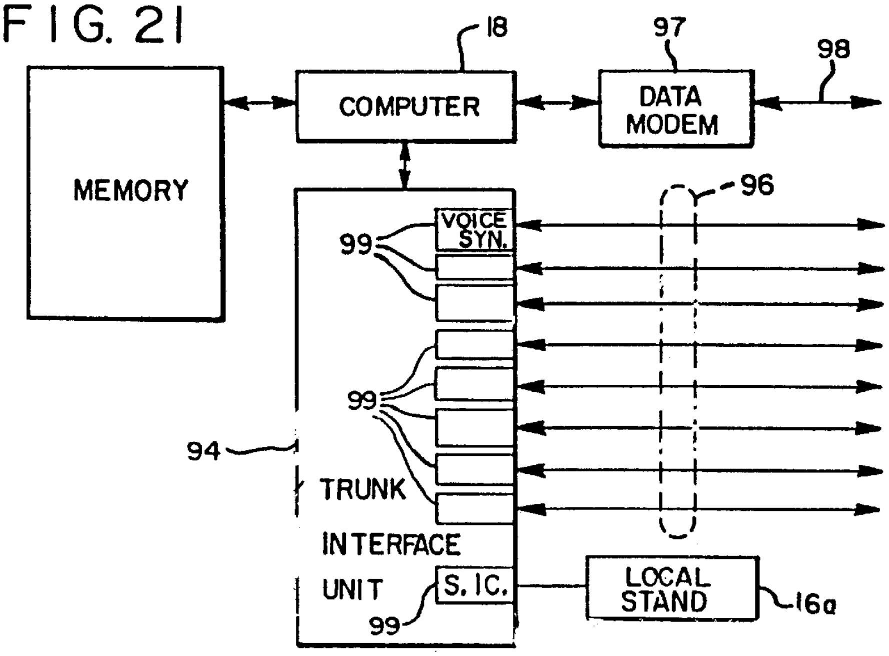

SECURE ENTRY SYSTEM WITH RADIO REPROGRAMMING

This application is a continuation of U.S. application Ser. No. 07/864,958, filed Mar. 7, 1992, now abandoned, which is a division of U.S. application Ser. No. 07/806,801, filed Dec. 5, 1991, now U.S. Pat. No. 5,245,652, which is a continuation of Ser. No. 07/640,255, filed Jan. 11, 1991, now abandoned, which is a division of Ser. No. 07/303,711, filed Jan. 27, 1989, now U.S. Pat. No. 4,988,987, which is a continuation in part of Ser. No. 07/192,853, filed May 11, 1988, now abandoned, which is a division of Ser. No. 07/015,864, filed Feb. 17, 1987, now U.S. Pat. No. 4,766, 746, which is a continuation in part of Ser. No. 06/831,601, filed Feb. 21, 1986, now U.S. Pat. No. 4,727,368, which is a continuation in part of Ser. No. 06/814,364, filed Dec. 30, 1985, now abandoned, which is a continuation in part of Ser. No. 06/788,072, filed Oct. 16, 1985, now abandoned. These applications and patents are incorporated herein by reference.

BACKGROUND AND SUMMARY OF THE INVENTION

The present invention relates to real estate lockboxes and other secure entry systems. Lockboxes are used in the real estate industry to contain the keys of houses listed for sale. Prior art lockboxes have primarily been mechanical devices which allow access to a secure compartment by use of a conventional key. Such lockboxes and keys, however, have had numerous disadvantages. These disadvantages have been overcome by the present invention and a great number of new features have been provided.

In accordance with the preferred embodiment of the present invention, one or more lock or key units of a secure entry system is equipped with a radio receiver. The receiver permits a memory in the lock or key unit to be updated with new data that is modulated onto a radio frequency signal. By this technique, system-wide changes of data, such as changes of lockout lists and access codes, and changes targeted to specific units, such as disabling a particular key, can be implemented simply and quickly.

The foregoing and additional features and advantages of the present invention will be more readily apparent from the following detailed description of a preferred embodiment thereof, which proceeds with reference to the accompanying drawings.

BRIEF DESCRIPTION OF THE DRAWINGS

FIG. 18*a* is a schematic block diagram of the electronic circuitry used a local stand according to the present invention.

FIG. 18*b* is a schematic block diagram of the electronic circuitry used in a remote stand according to the present invention.

FIG. 21 shows a computer and trunk interface unit used in an enhanced version of the system of FIG. 1.

DETAILED DESCRIPTION OF A PREFERRED EMBODIMENT

GENERAL OVERVIEW

Figure 1:
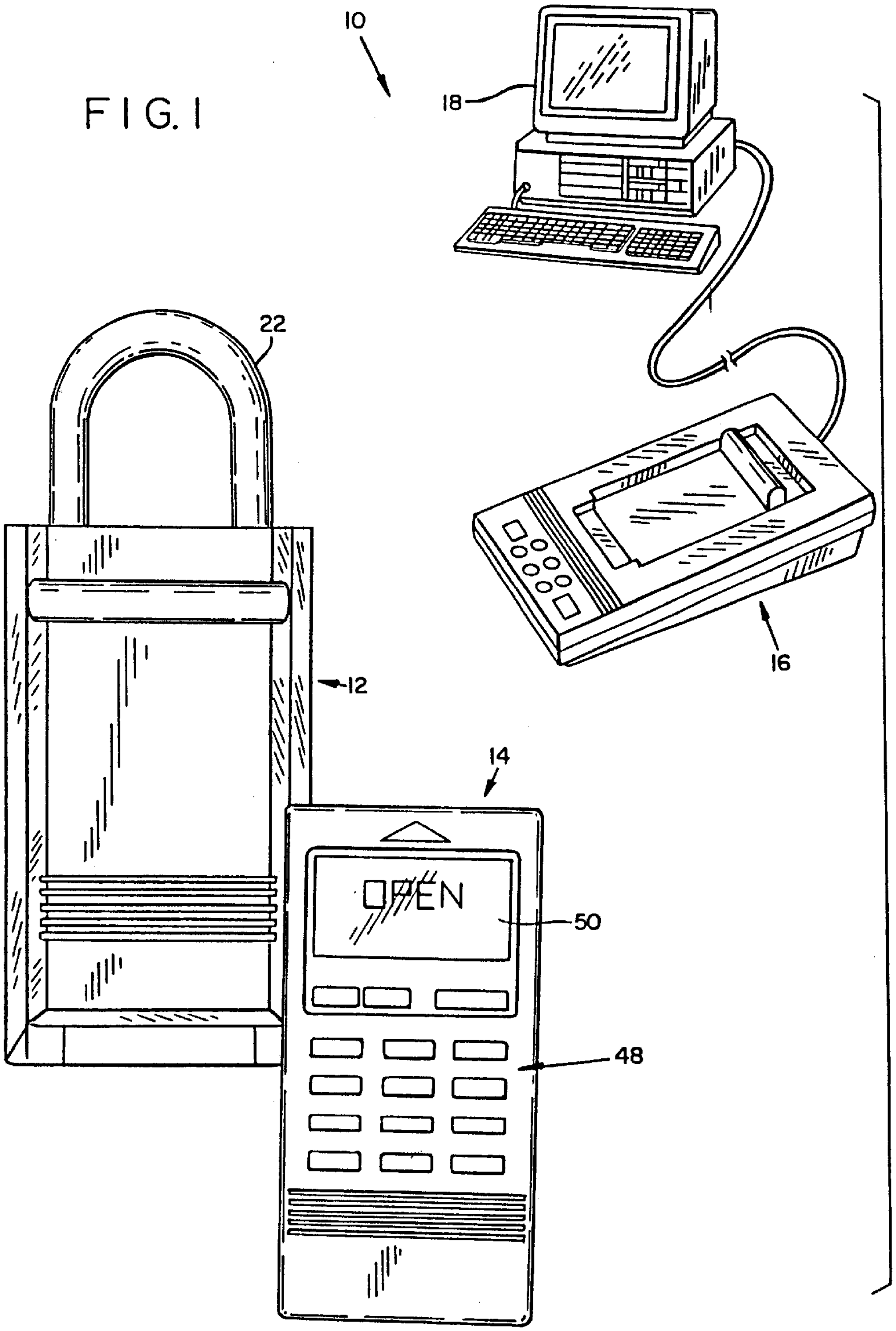
FIG. 1 shows a lockbox, a key, a stand and a computer used in a lockbox system according to the present invention.

A basic lockbox system 10 according to the present invention, shown in FIG. 1, includes one or more lockboxes, or keysafes, 12, electronic keys 14, stands 16 and computers 18. Lockbox 12 contains the door key to the listed dwelling and is mounted securely on or near the dwelling. Electronic key 14 is used by real estate agents to open the lockbox and gain access to the dwelling key contained therein. Key 14 can also be used to read access log data from the lockbox and to load programming instructions into it. Stand 16 is used to interface computer 18 with the lockbox and key units. Computer 18 is used to store instructions in and to collect data from lockbox 12 and key 14 so as to integrate management of a lockbox system.

LOCKBOX

Figure 2:
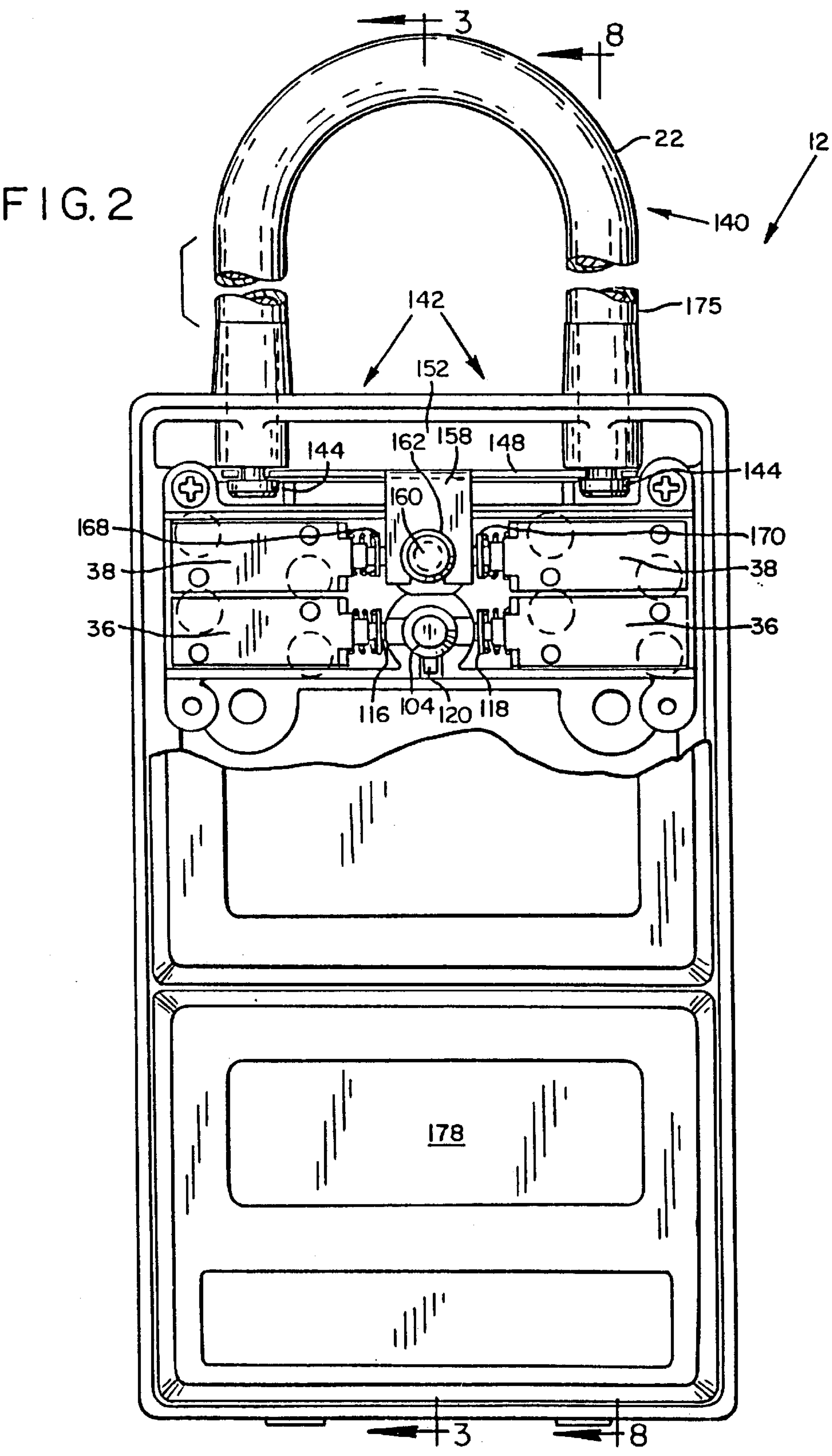
FIG. 2 is a rear view, partially in section, schematically illustrating portions of a lockbox according to the present invention.
Figure 3:
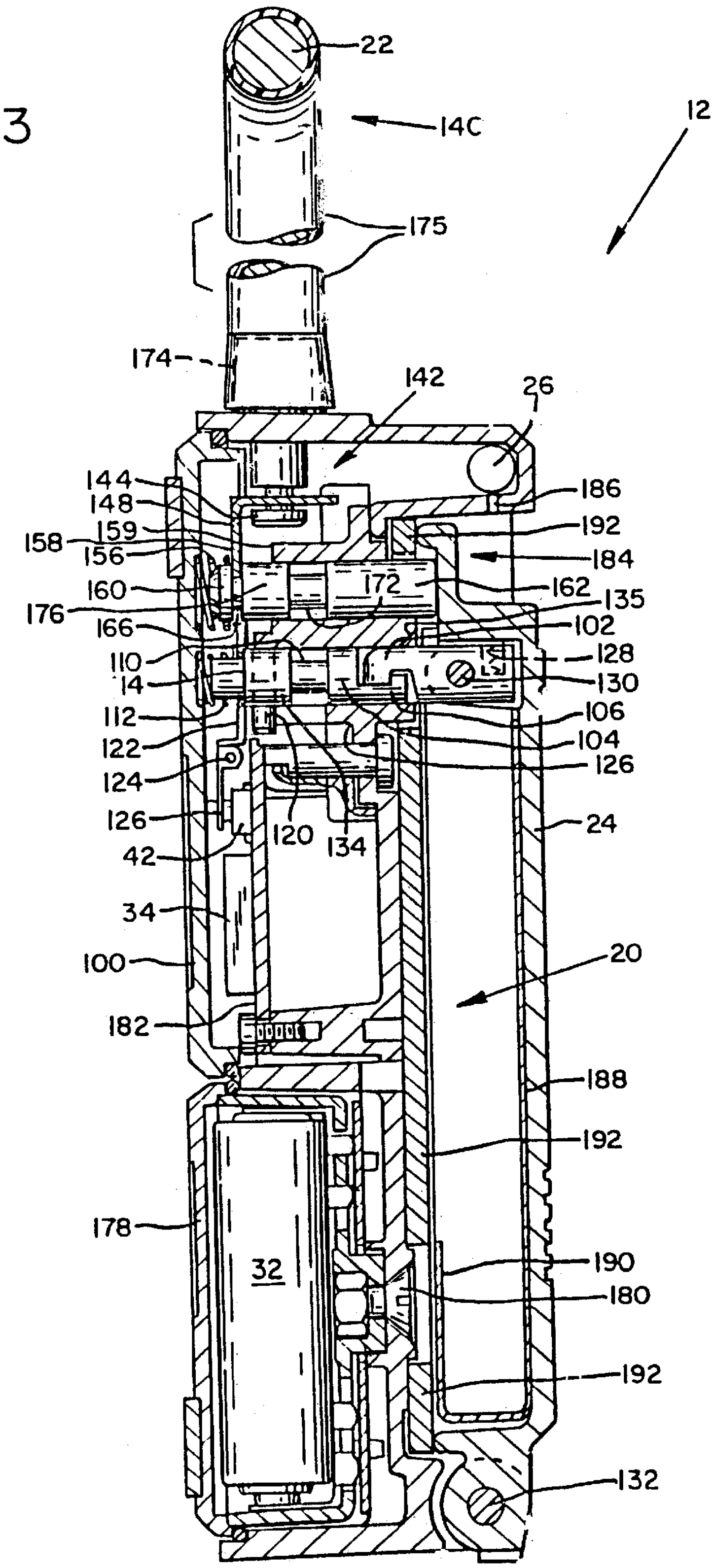
FIG. 3 is a sectional view taken along line 3—3 of FIG. 2, schematically illustrating some of the locking components in a lockbox according to the present invention.

With reference to FIGS. 2–3, lockbox 12 includes a secure enclosure, or house key compartment 20 designed to contain house keys, business cards, written messages and the like. Lockbox 12 is securely attached to the listed house or other fixed object by a shackle 22 or by screws (not shown). Shackle 22 in most instances attaches the lockbox to a doorknob, water spigot or porch guard rail. Upon a proper exchange of signals between lockbox 12 and key 14, a door 24 to the lockbox house key compartment 20 can be opened, thereby allowing access to the house key and to other materials stored inside.

Figure 9:
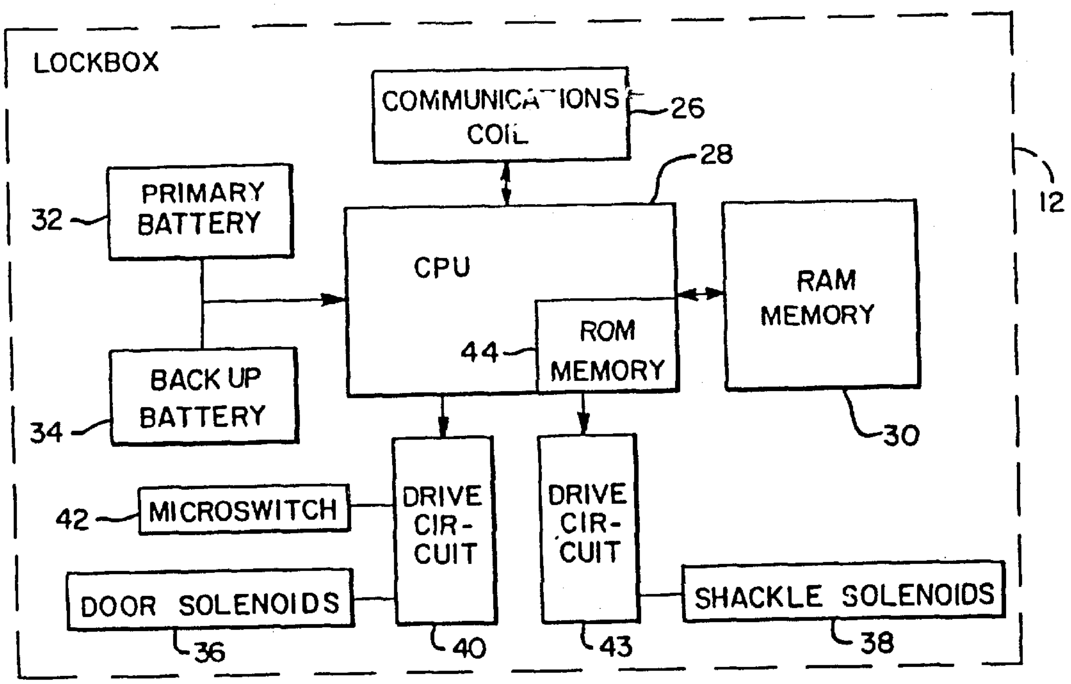
FIG. 9 is a schematic block diagram of the electronic circuitry used in the lockbox of FIGS. 2 and 3.

The circuitry of lockbox 12 is shown in block diagram form in FIG. 9. Lockbox 12 includes a communications coil 26, a microprocessor (CPU) 28, a read/write (RAM) memory 30, a primary battery 32, a backup battery 34, a pair of key compartment locking solenoids 36, a pair of shackle locking solenoids 38, a key compartment solenoid drive circuit 40, an associated microswitch 42 and a shackle solenoid drive circuit 43.

Communications coil 26 is used to electro-magnetically couple to corresponding coils in key 14 and stand 16. Microprocessor 28 controls operation of lockbox 12 according to programming instructions ("lockbox control software") permanently stored in an associated read only memory (ROM) 44. RAM memory 30 is used to store various elements and strings of operating data. Primary battery 32 provides power to the lockbox circuitry. Backup battery 34 is used when the primary battery becomes weak or is removed for replacement. Key compartment locking solenoids 36 releasably lock house key compartment door 24 under the control of door solenoid drive circuit 40 and microswitch 42. Shackle locking solenoids 38 releasably lock shackle 22 under the control of shackle solenoid drive circuit 43.

Although illustrated as a single component, lockbox CPU 28 is in fact two discrete microprocessor circuits. The first, a National Semiconductor 820 Series Control Oriented Processor, is an eight bit processor that performs all control, communications and logic functions with the exception of timing and calendar-clock functions. These functions are performed by a National Semiconductor COP 498 processor which is mask programmed by the manufacturer to perform a variety of time keeping functions. The lockbox RAM 30 is comprised of a low power, low voltage Toshiba LC3517NC RAM circuit, which is organized as 2048 eight bit bytes.

Lockbox CPU 28 stores information on certain of the operations that are executed, or attempted to be executed, by a key or the lockbox in a portion of RAM memory 30 termed the "access log." Each entry in the access log includes the identity of the key, the date and time of the operation (obtained from the calendar-clock portion of CPU 28), the function attempted and, if the function was denied, the reason why. In the illustrated exemplary embodiment, the lockbox access log can store information on 100 lockbox operations. This log can later be retrieved, in whole or in part, by key 14 or by stand 16 for transfer to computer 18 or for display on a CRT screen or printer.

Management of the lockbox access log is performed by lockbox CPU 28 in conjunction with a "roll flag" and a "pointer" stored in lockbox RAM 30. The roll flag indicates whether all 100 entries in the access log have been filled and consequently whether the memory is recycling, overwriting old data. The pointer indicates the address of the memory location at which the next access log entry will be stored.

When the lockbox is initialized (discussed below in the section entitled Initialization and Deactivation of Lockboxes and Keys by the Computer), the roll flag is set to "0" and the pointer is set to indicate the address of the first memory location in the access log. Thereafter, each entry in the log causes the pointer to increment to the address of the next memory location in the log.

After 100 entries have been stored in the access log, the pointer recycles and indicates again the address of the first memory location in the access log. At this point, the rollover flag is set to "1," indicating that the access log has become a circular data buffer and that each additional entry will overwrite an earlier entry.

Lockbox Characterization Instructions

Lockbox 12 is characterized by "lockbox characterization instructions" loaded into lockbox RAM memory 30 by a computer through a stand. (Key 14 can also be used to load a set of limited characterization instructions into lockbox RAM memory 30, as discussed below in the section entitled Functions). The lockbox characterization instructions give the lockbox an identity, fix in it certain numerical values and enable it to perform certain functions.

Figure 13:
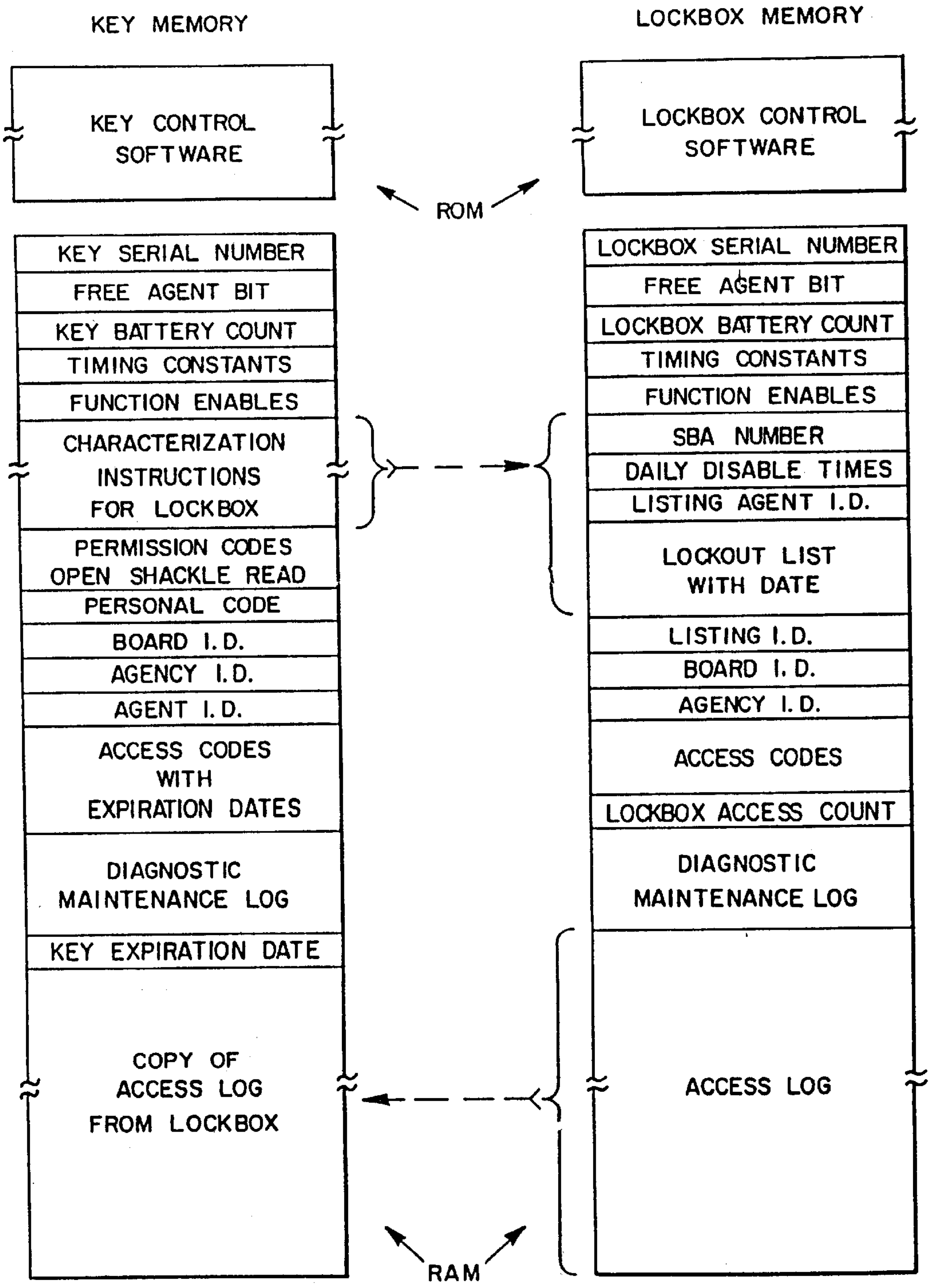
FIG. 13 is a diagram illustrating portions of the electronic memories used by the lockbox and key of the present invention.

As shown in the illustrative lockbox memory map in FIG. 13, the identification information loaded with the characterization instructions identifies the listing, the listing agent, the responsible agency and the responsible board. The identification information further identifies the lockbox by a unique lockbox serial number.

Some of the numerical values loaded into the lockbox include a "Shown By Arrangement" (SBA) number, a key lockout list and a collection of lockbox access codes.

Functions enabled by function enable bits in the characterization instructions may include Lockbox Disable On Removal and Privacy Read (both discussed below in the section entitled Programmable Lockbox Options).

After its initial characterization by stand 16, lockbox 12 will not require further maintenance or programming until the lockbox is moved to a new location.

Mechanical details of the lockbox 12 are discussed below in the section entitled Mechanical Construction of Lockbox.

KEY

Figure 10:
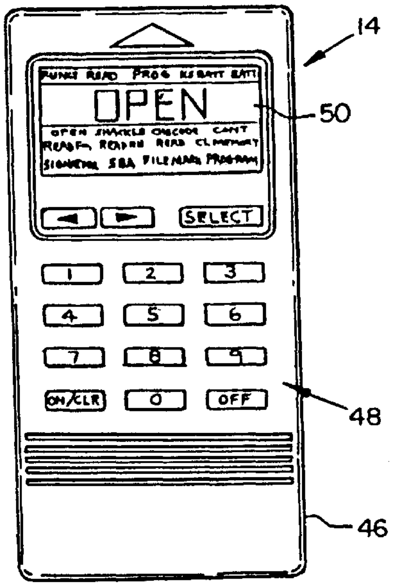
FIG. 10 is a plan view of a key according to the present invention.
Figure 11:
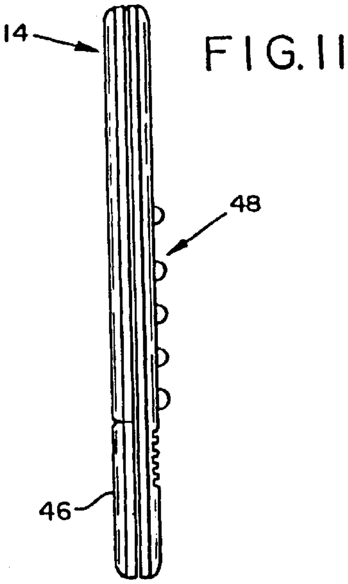
FIG. 11 is a left side view of the key of FIG. 10.
Figure 14:
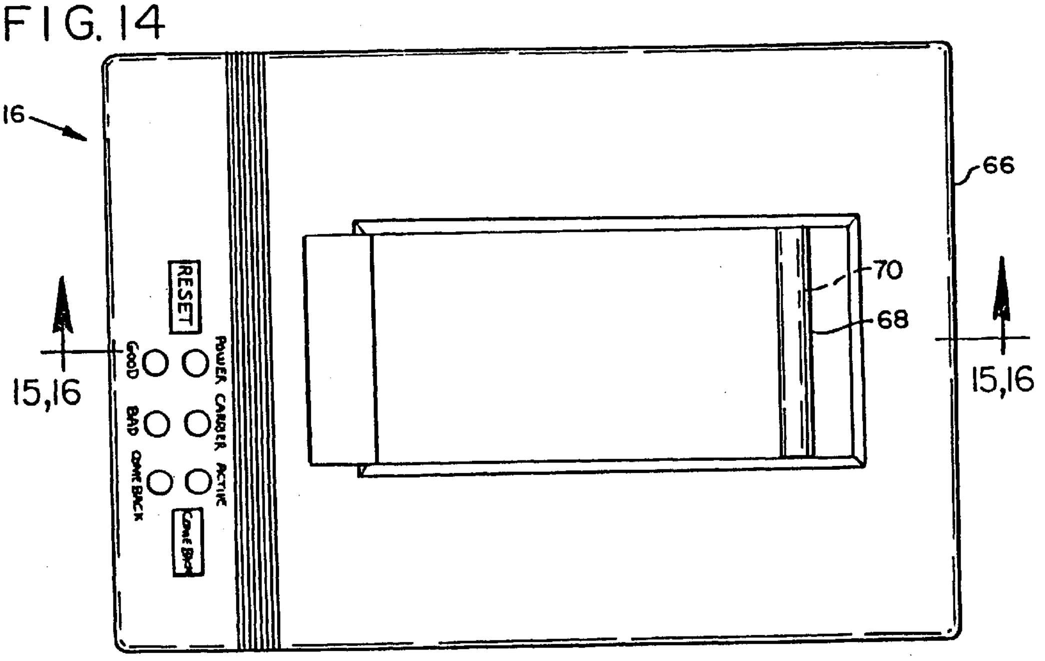
FIG. 14 is a top plan view of a remote stand according to the present invention.

With reference to FIGS. 10 and 11, key 14 is constructed in a trim polycarbonate enclosure 46 sized to fit conveniently in a user's purse or pocket. The key includes a keypad 48 and an LCD display 50. Keypad 48 is used to enter commands into the key. LCD display 50 is used to display instructions and information to the user.

LCD display 50 includes a central message portion in which messages from the system can be displayed to the user. Display 50 also includes a lower portion comprising a "prompt" field and an upper portion comprising an "annunciator" field. The prompt field includes twelve potential prompts which represent twelve functions that a user can request the key to execute. They are OPEN, SHACKLE RELEASE, CHANGE PERSONAL CODE, CONTROLLER, READ FILE MARK, READ NN, READ, CLEAR MEMORY, SIGNATURE, SHOWN BY ARRANGEMENT, FILE MARK, and PROGRAM. These functions are discussed below in the section entitled Functions.

The annunciator field includes five potential annunciators which indicate the status of various aspects of the key. The annunciators in the preferred embodiment are FUNCTION, READ, PROGRAM, KEYSAFE BATTERY and KEY BATTERY.

The READ annunciator is made visible when the key contains lockbox access log data transferred from a lockbox during a READ operation. The PROGRAM annunciator is made visible when the key contains a set of limited characterization instructions that are to be loaded into a lockbox. The FUNCTION annunciator is made visible when the user is to select a function to be executed. The KEYSAFE BATTERY and the KEY BATTERY annunciators are made visible when the batteries for these respective units need attention.

Figure 12:
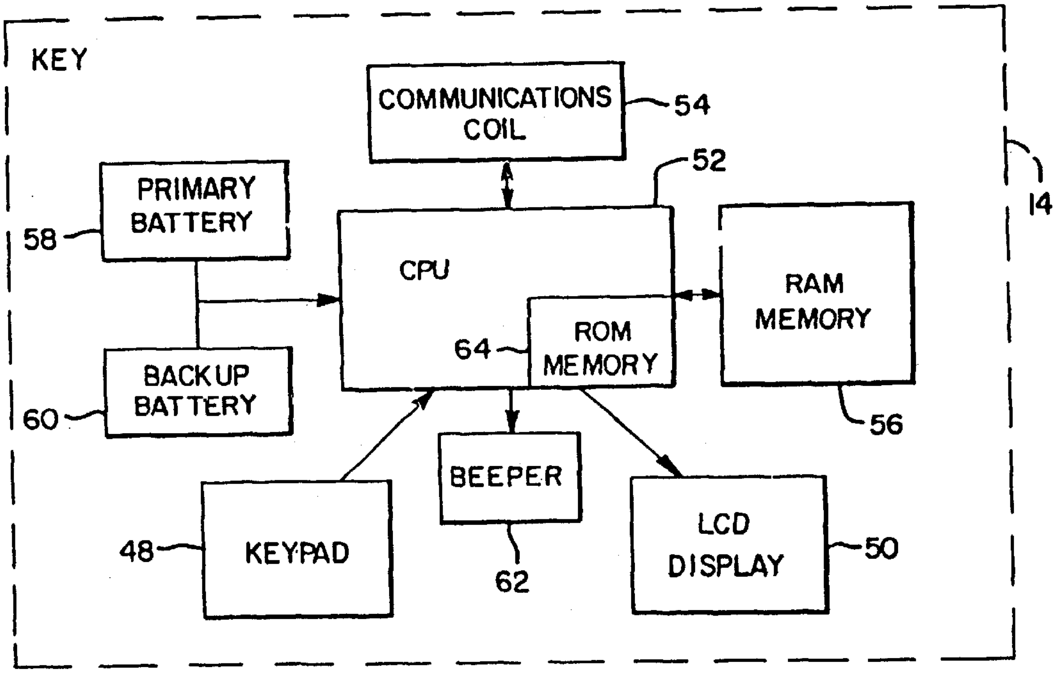
FIG. 12 is a schematic block diagram of the electronic circuitry used in the key shown in FIGS. 10 and 11.

The circuitry of key 14 is shown in block diagram form in FIG. 12. Key 14 includes a communications coil 54, a key microprocessor (CPU) 52, the keypad or other switch mechanism 48, the LCD display 50, a read/write memory (RAM) 56, a primary battery 58, a backup battery 60 and a beeper 62.

Communications coil 54 is used to electromagnetically couple to the corresponding coils in lockbox 12 and stand 16. Microprocessor 52 controls operation of key 14 according to programming instructions ("key control software") permanently stored in an associated read only memory (ROM) 64. RAM memory 56 again comprises a Toshiba LC3517NC RAM circuit and is used to store various elements and strings of operating data. Primary battery 58 provides power to the key circuitry. Backup battery 60 is used when the primary battery becomes weak or is removed for replacement. Beeper 62 beeps to call the user's attention to the key in a variety of instances, such as when an error is committed or when the key and lockbox have successfully completed an operation.

Although illustrated as a single component, key CPU 52 also comprises two discrete microprocessor circuits. The first, a National Semiconductor 820 Series Control Oriented Processer, is an eight bit processor that performs all control, communications and logic functions except reading data from keypad 48 and controlling operation of LCD display 50 and beeper 62. These functions are performed by a very low power NEC uPD7501 4 bit microcontroller with an on board LCD driver. The distribution of processing tasks between two processors in this manner reduces power consumption and increases operational efficiency by allocating the time consuming user interface chores to the very low power NEC processor, thereby allowing the logic functions to be more quickly performed using the higher power National processor.

Key Characterization Instructions

Key 14 is characterized by "key characterization instructions" loaded into key RAM memory 56 by a computer through a stand. These instructions give the key an identity, fix in it certain numerical values and enable it to perform certain functions.

As shown in the illustrative key memory map in FIG. 13, the identification information loaded with the characterization instructions identifies the agent, the responsible agency and the responsible board. The identification information further identifies the key by a unique serial number.

Some of the numerical values loaded with the key characterization instructions include a four digit personal code, permission codes for various of the functions and various key access codes with associated expiration dates.

Functions enabled by function enable bits in the characterization instructions may include OPEN, READ and SHACKLE RELEASE.

After its initial characterization by stand 16, key 14 will not require further programming until any time dependent functions which may have been enabled, such as key expiration date or expiring key access codes (discussed below) need updating.

Limited Function Keys

This key described above can, if loaded with the proper characterization instructions, execute the entire complement of functions available on the system, here illustrated as twelve. In some applications, however, it is desirable to provide simpler keys which can effect only a limited range of functions. Thus, it may be desirable, for example, to provide keys that can perform just three functions: open a lockbox, drop a shackle and communicate with a computer. Such a simple key could be constructed without an LCD display.

Limiting the functions that a key can perform can be effected by setting certain enable/disable bits in key RAM memory 56. In the preferred embodiment, key RAM memory 56 has an enable/disable data bit corresponding to each of the twelve functions. If the enable/disable data bit corresponding to a function is set to a "1," the function is enabled. If set to a "0," the function is disabled.

The enable/disable data in key RAM memory 56 is desirably set by the manufacturer so as to enable a particular set of functions. This arrangement permits the manufacturer to provide a variety of different keys to users having a variety of different requirements without the need to tool up a separate manufacturing line for each different key. If the manufacturer later wishes to change a key's enable/disable data, it can do so by reprogramming the this data itself or by providing software to the responsible real estate board that will enable the board computer to reprogram this data.

In an alternative embodiment, key RAM memory 56 can have two data bits corresponding to each of the twelve functions. One of these bits is set by the manufacturer to a "0" or a "1" and cannot be altered by the user. The other of these bits can be set to a "0" or a "1" by the authority that exercises supervisory control over the key, usually the local real estate board. In this alternative embodiment, the only functions that are enabled are those for which corresponding enable/disable data bits have both been set to a "1" by the appropriate authority. By this alternative system, the local real estate board is empowered to tailor the capabilities of its keys as it sees fit within the range of functions enabled by the manufacturer.

Programmable Time Constants

In the preferred embodiment, all time constants in the both the lockbox and key are set by data bits stored in the respective units' RAM memories (as illustrated by the lockbox and key memory maps of FIG. 13). These time constants set, for example, the length of time each of the transient displays are maintained in LCD display 50 and the length of time lockbox key compartment unlocking solenoids 36 are to be kept energized.

STAND

Stand 16 is used in the present invention to transfer information between computer 18 and the lockbox and key components of a lockbox system.

Figure 15:
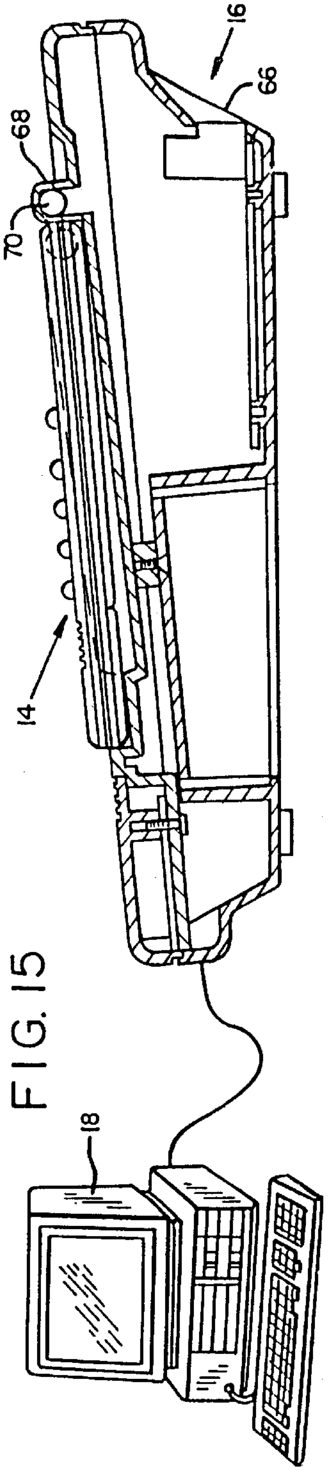
FIG. 15 is a sectional view taken along lines 15—15 of FIG. 14 and showing the stand with two different sizes of keys.
Figure 16:
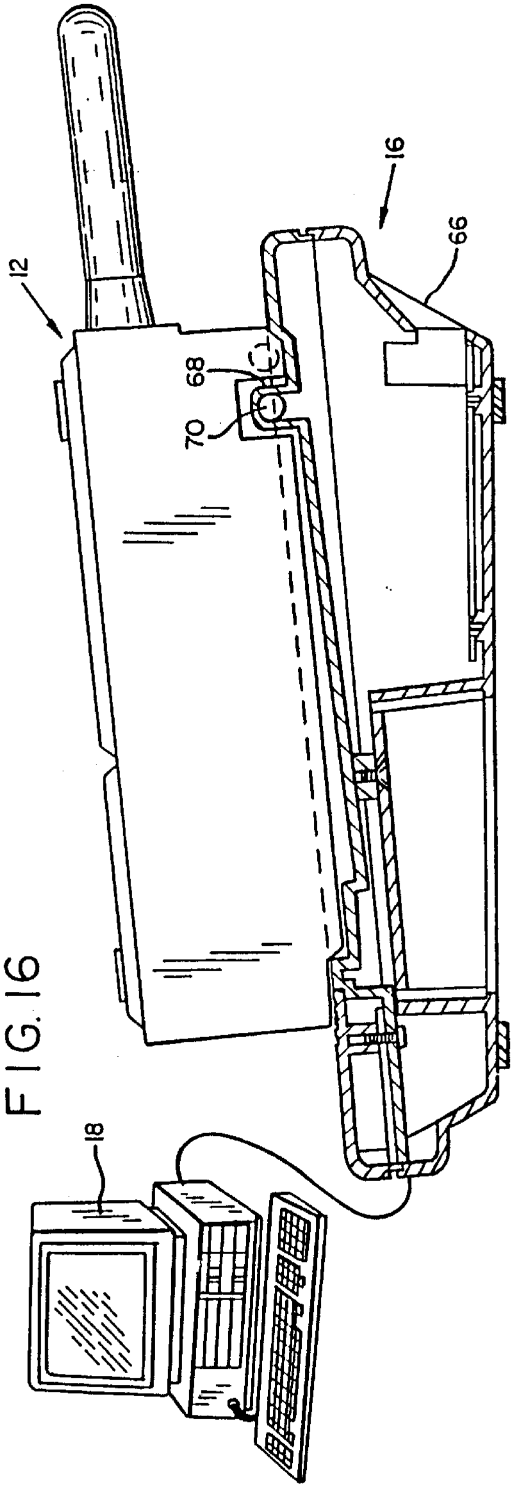
FIG. 16 is a sectional view taken along lines 16—16 of FIG. 14 and showing the stand coupled to a lockbox.

With reference to FIGS. 14–17, stand 16 can comprise an enclosure 66 having a protrusion 68. Within protrusion 68 is a stand communications coil 70. In use, a key or a lockbox is positioned on stand 16 as shown in FIGS. 15 and 16, respectively. In these positions, the communications coil within the lockbox or key is positioned in proximity with stand communications coil 70 in protrusion 68, thereby establishing electromagnetic coupling between such coils.

In alternative embodiments, protrusion 68 can be omitted. In such embodiments, communications coil 70 can be disposed within enclosure 66 so that it is adjacent the coils in corresponding lockbox or key units when such units are placed on the stand.

As illustrated in FIGS. 18*a* and 18*b*, stand 16 is constructed in two forms. A first form of the stand, termed a local stand 16*a*, is designed to communicate with a computer at the same site. Local stands are thus intended for use at the board office, where they are tied directly to the board computer, or at agency offices, where they may be tied directly to a smaller computer.

The second form of stand, termed a remote stand 16*b*, is a portable unit designed to communicate with a remote computer over conventional telephone lines. Remote stands 16*b* are thus typically used at agency offices that are not equipped with their own computers. Their portable nature, however, allows remote stands to be used wherever there is a phone line, such as at a property listed for sale, thereby enabling an agent to retrieve data from the board computer and provide a homeowner immediate information about listing activity.

Figure 17:
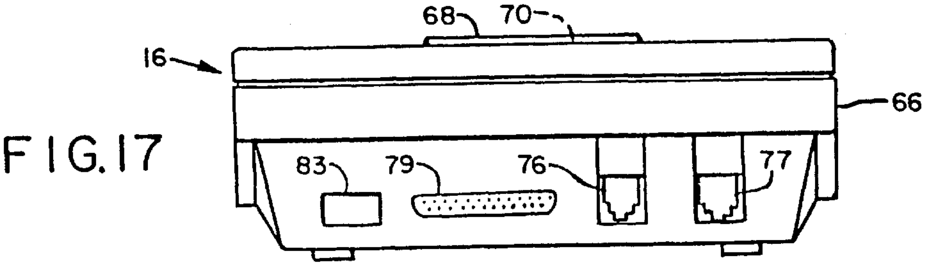
FIG. 17 is a rear elevational view of the stand shown in FIG. 14.

With reference to FIGS. 17, 18*a* and 18*b*, both forms of stand 16 include a microprocessor (CPU) 78, an associated read only memory 80, a read/write memory (RAM) 82 and a connector 83 for connection to a low voltage D.C. power supply. Local stand 16*a* further includes a cable connector 72 for connection to the local computer. Remote stand 16*b* further includes a modem 74 and two modular phone jacks 76, 77 for interfacing to a telephone line. First phone jack 76 is used to connect to the outgoing phone line. Second phone jack 77 is used to connect to a conventional telephone (not shown) which provides dialing signals on the outgoing phone line. Remote stand 16*b* also includes a printer output port 79 for interfacing to a printer. This printer is driven by the remote computer through the stand and permits hard copy display of the data at the agency office or at the remote site at which the stand is used even though a computer is not locally available.

Desirably, CPU 78 comprises an Intel 8051 Series microprocessor and RAM 82 comprises a NEC uPD4364 8192 by 8 bit static RAM.

In order to ensure data security, stand 16 desirably encrypts the lockbox and key data before it is sent to the computer. Conversely, stand 16 decrypts the computer data before it is sent to the lockbox and key. This encryption/decryption is effected by microprocessor 78 in conjunction with read only memory 80 and read/write memory 82. ROM memory 80 contains the encryption and decryption algorithms used by stand 16 in communicating with computer 18. RAM memory 82 is used for temporary storage of data used in this process.

The encryption algorithms employed are such that if the same data is exchanged between stand 16 and computer 18 several times, the several transmissions will bear no resemblance to one another. Decryption by unauthorized eavesdroppers is thus deterred.

In the preferred embodiment, the data exchanged between stand 16 and the lockbox and key components is also similarly encrypted.

Stand Functions

Stand 16 can perform a variety of functions in the present invention. First, stand 16 can provide a complete set of new characterization instructions for lockbox 12 or key 14, or can simply modify an existing set of instructions. This is done by placing the key or lockbox on stand 16, as illustrated in FIGS. 15 and 16, and executing a recharacterization program on computer 18. The recharacterization program executed on computer 18 interrogates the user, using a menu display format on the computer screen, as to which functions are to be enabled, what constants are to be loaded, etc. The characterization instructions generated by the recharacterization program are then transferred from the computer through the stand to the key or lockbox, where they are stored in RAM memory.

A set of limited recharacterization instructions for lockbox 12 can alternatively be loaded from stand 16 into key 14 for later relaying by the key into the lockbox by using the PROGRAM function (discussed below in the section entitled Functions).

The second function stand 16 can perform is to retrieve data, such as lockbox access log data, from the lockbox or the key and to relay it to computer 18. This is accomplished by positioning lockbox 12 or key 14 on stand 16 and executing an appropriate program, this time a data retrieval program, on computer 18.

Stand 16 can also be used for a variety of other purposes, such as for relaying diagnostic maintenance log data (discussed below in the section entitled Diagnostic Features) from the key or lockbox to the computer and for synchronizing the calendar-clock portion of lockbox CPU 28 with the master calendar-clock maintained by computer 18.

One important feature provided by stand 16 is that it allows data transfers to and from the key and lockbox components without the need to take such components back to a central control computer at the real estate board office. In large metropolitan areas, such as Houston, the local real estate board may encompass several thousand square miles. Consequently, it is highly undesirable to require that lockboxes and keys be taken back to the board office every time an exchange of data is desired. The relatively inexpensive stands of the present invention can be distributed throughout the board's territory and can be used to effect all data transfers. Desirably, most of the agency offices within the real estate board would have such a unit and several additional units would be available for portable use within the board's territory.

OPERATION

To operate the lockbox system, the user first energizes, or wakes up, key 14 by pushing an ON/CLEAR button on keypad 48. Beeper 62 beeps to confirm that the key is energized. The key then displays the word "CODE" in the message portion of LCD display 50 in blinking form. The user then has a fixed time period, such as one minute, within which to enter a four digit personal code. As each digit of the personal code is entered, an asterisk appears in LCD display 50. The asterisks maintain the privacy of the personal code while indicating the number of digits entered. If no personal code is entered within the one minute time period, key CPU 52 causes the key to become deenergized, or return to sleep, again. If the four digit personal code entered by the user matches the personal code stored in key RAM memory 56, the user is prompted to select a function.

If an improper four digit personal code is entered on keypad 48, key 14 will not allow the user to select a function.

The user can start over and try to enter the correct personal code. If, after four tries, the proper personal code has still not been entered, key CPU 52 causes the key to enter a "personal code timeout" mode in which the key is deactivated for a ten minute period and during which it will not allow any further personal codes to be entered.

After the four digit personal code has been successfully entered, the FUNCTION annunciator in the upper portion of LCD display 50 is made visible, together with the prompts in the lower portion of the display representing the available functions. (Key CPU 52 causes the prompts corresponding to the functions that are not available, for example those functions which have been disabled, to remain invisible in LCD display 50). The top left-hand most prompt in the prompt field, normally the OPEN prompt, will be blinking. It is the blinking prompt that indicates which function will be executed if the SELECT button is pressed.

Movement of the blinking feature in the LCD prompt display is controlled by the RIGHT SCROLL and LEFT SCROLL buttons on keypad 48. The RIGHT SCROLL button causes the blinking feature to move one prompt to the right, for example, from OPEN to SHACKLE RELEASE. When the right-most prompt in a display line is blinking and the RIGHT SCROLL button is pressed, the blinking feature is moved to the left-most prompt in the following line. The LEFT SCROLL button moves the blinking feature in the opposite direction in a similar fashion.

After the personal code has been entered successfully, it is the OPEN prompt that blinks. Consequently, to open the lockbox, which is the most common operation, the SCROLL buttons need not be operated at all. Instead, the SELECT button is simply pressed and the lockbox can be opened.

Once the SELECT button is pressed, CPU 52 causes all of the prompts to be made invisible, except the selected prompt, which is caused to stay on ontinuously, not blinking.

When the personal code has been successfully entered and a function has been selected, key 14 is termed "armed." In the armed state, the key sends out a signal, termed here a characteristic interrogation pulse train, and seeks to couple with a lockbox. When the key is ultimately coupled with a lockbox, the electromagnetic pulses radiated by the key induce a voltage in the lockbox communications coil. The induction of this voltage in the lockbox signals the lockbox to wake up. The lockbox then responds by transmitting a second signal back to the key, as discussed below in the section entitled Authorization of Lockbox Functions.

When the OPEN feature has been selected, the four letter message field in the middle of LCD display 50 displays the word "SAFE" (short for keysafe) in blinking form. (A blinking message in the message portion of the display demands an action by the user. A solid display in the message portion indicates that the key is finished with the function). When the "SAFE" message is blinking in the message portion of the display, the user has approximately ten minutes within which to engage a key with the lockbox.

Once the key and lockbox are successfully coupled, the message display, instead of displaying the "SAFE" message in blinking form, displays a "WAIT" message in solid form. This indicates to the user that the key and lockbox are coupled and are communicating. During the "WAIT" state, various data is exchanged between the key and the lockbox and each of the microprocessors is making various decisions as to whether to authorize execution of the selected function (as described below in the section entitled Authorization of Lockbox Functions). Finally, the processors decide, either together, or one informs the other, that the selected operation can be executed.

After the requisite exchange of data between key and lockbox has successfully been completed and the requested function has been executed, the message in key LCD display 50 changes from "WAIT" to "GOOD." The "GOOD" message is displayed whenever any operation is successfully completed. The successful execution of the function is also confirmed audibly by beeper 62. The "GOOD" display is maintained for approximately eight seconds. The key then displays the KEYSAFE BATTERY annunciator if the lockbox battery is low (discussed below in the section entitled Battery Systems) and then returns to sleep.

If a user arms a key and then fails to complete the selected operation with a lockbox, the key eventually goes into an error condition. Beeper 62 beeps and an appropriate error code is displayed in the message display. The key then returns to sleep after displaying the error message for a predetermined time period.

One important feature of the invention is that the key strokes necessary to request a function need not be entered while the key is coupled to the lockbox. As indicated, key 14 must be held near lockbox 12 in order for the units to communicate. Although not usually a problem, this task is sometimes difficult when the lockbox is mounted in a dark or awkward location, such as on a water spigot mounted at ground level. In some embodiments, the user would need to engage the key with the lockbox in such position and then start pressing buttons on keypad 48 corresponding to the required personal code and the desired function.

To obviate this potential problem, the key control software allows the key to be armed in advance to request execution of a desired function. The key can then be mated momentarily with the lockbox and the handshaking signal exchanges made automatically when the lockbox detects the key's characteristic interrogation signal. Thus, the user need not press a single key in the dark or cramped location in which the key and lockbox may be mated in order to operate the lockbox. The personal code can be entered and the desired function selected in a convenient, well-lit location, such as in a car. The agent then has a fixed period, such as ten minutes, within which to use the armed key to operate the lockbox. After this period, the key disarms itself so as to maintain system security.

In addition to providing a convenience to the user, the ability of the key to be armed at a remote location and later coupled with the lockbox to execute a function also provides an important security benefit. That is, it allows the key to be armed away from prying eyes so as to maintain the secrecy of the user's personal code.

FUNCTIONS

Open

To open house key compartment 20 in lockbox 12, the user enters the four digit personal code on key 14, thereby causing the OPEN prompt in LCD display 50 to blink. The SELECT button is then pressed and an exchange of authorization signals between the lockbox and key is begun once the units are successfully coupled. If the lockbox and key determine that the function is authorized, lockbox CPU 28 allows key compartment door 24 to be opened.

In the preferred embodiment, key compartment door 24 does not pop open when the exchange of signals has been completed successfully. Instead, a press-to-open mechanism is provided on the door. After the appropriate signals have been exchanged, the user presses door 24 inwardly and then releases. The door then pops open to reveal the contents of compartment 20.

If the user does not open the press-to-open door within a predetermined period of time, such as sixty seconds, the lockbox reverts to its powered down, locked state.

In order to conserve lockbox battery power, key compartment unlocking solenoids 36 are not energized until the user presses the press-to-open door. To effect this power savings, lockbox 12 is provided with a microswitch 42 connected in key compartment solenoid drive circuit 40 so that when door 24 is pressed in, the microswitch is engaged and closed. When door 24 is pressed in, CPU 28 detects the closure of microswitch 42 and causes drive circuit 40 to then apply energy to key compartment solenoids 36 for a brief period. The solenoids retract, thereby unlocking door 24. The user then releases the door and it pops open under the influence of a spring. The solenoids are thus not energized until the user is actually ready to open the door. (The solenoids are arranged in lockbox 12 so that the inward pushing movement of key compartment door 24 is allowed even when the solenoids are in their locked state).

After microswitch 42 is reopened by the door popping open, lockbox CPU 28 waits approximately 0.25 seconds and then causes drive circuit 40 to deenergize the solenoids. It has been found that in a typical opening, the locking solenoids are energized for less than 0.5 seconds. After deenergizing the solenoids, the lockbox returns to its sleeping state.

If door 24 is pressed in but is not released for more than 1.25 seconds, solenoids 36 are deenergized to secure the lockbox and the lockbox returns to sleep.

In the preferred embodiment, key compartment door 24 is provided with two solenoids to enhance lockbox security. Each solenoid has a spring loaded plunger. If only a single solenoid were used, the solenoid could be dislodged momentarily from its locking position by a sharp blow to the lockbox. The shock could propel the solenoid plunger momentarily to its retracted state, allowing door 24 to be opened.

In the preferred embodiment, two solenoids are used and are disposed so that their plungers travel in opposite directions. If the lockbox is sharply rapped so as to propel one solenoid plunger to its unlocked position, the other solenoid plunger is propelled to its locked position.

In an alternative system using a single solenoid, a rotary solenoid could be used. However, such an arrangement is less efficient and more expensive than the present system and also requires additional latching components.

Shackle Release

The shackle 22 or mounting bracket which secures lockbox 12 to a structure is, in the preferred embodiment, released on command from a key. By allowing real estate agents to administer lockboxes, rather than just real estate board employees, administration of large lockbox systems is facilitated.

To release lockbox shackle 22, the user enters the four digit personal code into the key and moves the blinking feature in the prompt field to SHACKLE RELEASE. The SELECT button is then pressed and a "SAFE" message begins blinking in key LCD display 50. After the lockbox and key are coupled, these units exchange signals and, if these units decide that a shackle release is authorized, a "GOOD" message appears in LCD display 50 and a shackle release is permitted.

In the preferred embodiment of the invention, the SHACKLE RELEASE function opens lockbox door 24. Actual release of the shackle is then effected by movement of a press-to-release shackle locking stem 162 (which is unlocked by shackle locking solenoids 38), which in turn moves a shackle locking bar 148 out of engagement with the shackle. Like the key compartment door arrangement, the shackle locking system also uses a pair of reciprocally mounted solenoids to lock the shackle so as to enhance lockbox security.

Change Personal Code

When the user desires to change the four digit personal code, the CHANGE PERSONAL CODE function is used. The key is activated by the usual sequence of entering the four digit personal code and then moving the blinking feature in the prompt field until the CHANGE PERSONAL CODE prompt is blinking. When the SELECT button is pressed, the message display displays "NEW." The user then keys in the new four digit personal code that is to be substituted for the old code. Each time a digit of the new code is entered, an asterisk appears in the message portion of display 50. After all four digits have been entered, the "NEW" message is displayed again. The user then reenters the new code. By this redundant technique, key CPU 52 double checks the new personal code to insure that the user did not inadvertantly press a wrong key and thus enter a new personal code that was not intended and consequently would not be remembered.

After the successful entry of the new four digit personal code twice, the message display portion of LCD display 50 indicates "GOOD" to confirm that the operation has been completed satisfactorily.

Controller

As discussed earlier, a stand is used to exchange data and characterization instructions between the key and the computer. One way in which data can be exchanged between these units is simply to lay the sleeping key on the stand and press the ON/CLEAR button. The stand then couples electromagnetically to the energized key and allows the key to communicate with the computer. However, for security reasons, it is desirable that the computer not be allowed to perform the full range of possible functions on the key when the key is activated in this manner. An unauthorized user of a key could take the key and reprogram it if no further precautions were taken. Accordingly, it is desirable to limit the functions that the key and computer can cooperate to perform when the key is merely energized by the ON/CLEAR button to a narrow group of functions, such as running diagnostic routines and resetting the master software switch (discussed below). Thus the key will not permit new characterization instructions to be loaded.

In order for computer 18 to be allowed to perform its full complement of functions on the key, the key must be activated in the CONTROLLER mode by an authorized user. To do this, the user enters the four digit personal code and moves the blinking feature in the prompt field to CONTROLLER. When the SELECT button is pressed, the key permits the computer to freely read from and write to the key within the limits set by ownership of the key (i.e. a computer cannot reprogram a key if the key belongs to a different board).

Arming the key in the CONTROLLER mode is the only instance in which the key does not send out its characteristic interrogation pulse train. Instead, the key listens for data or instructions relayed from the stand.

File Mark

Skipping ahead in the key's prompt field somewhat, the FILE MARK function is selected to put a mark in the access log maintained by the lockbox. As noted, the illustrative access log maintained in RAM memory 30 of lockbox 12 contains data relating to the last 100 lockbox operations. Oftentimes, however, not all 100 past operations are of interest. For example, the supervising real estate board or agency may only be interested in operations over a certain period of time. To facilitate this function, the lockbox access log can be marked with file marks. The log can then be read in its entirety, or just from the last file mark to the end. By this technique, only the data of interest need be reviewed.

The FILE MARK function is useful when a real estate agency or board is interested in monitoring the access to a home during a specific period, as for example, during a weekend that the house is advertised in the newspaper. In such case, the listing agent could enter a file mark in the lockbox access log on a Friday evening. (Only the listing agent, or the listing agent's broker or board, is permitted to executed a FILE MARK function on a lockbox). An agent could then return the following Monday morning and recover only those entries in the access log made since the log was marked by using the READ FILE MARK function.

If a lockbox is moved from one house to another, a file mark can be used to indicate in the access log when the lockbox was moved. In one form of the invention, a file mark is entered in the access log automatically whenever the shackle is released. Data can then be selectively recovered from the access log so that only operations logged at the new location are recovered.

The entry that is actually recorded in the access log by a FILE MARK function is the same as any other logged function, but the log indicates that it is a FILE MARK function, rather than an OPEN, SHACKLE RELEASE, etc. The lockbox also records the other data usually stored in the access log, such as the identity of the user who executed the FILE MARK function, the date and time, etc.

Read

When the READ function is selected, lockbox CPU 28 causes all of the entries stored in the lockbox access log to be transmitted to the requesting key by relaying the access log data via the units' coupled communications coils. The key stores this received information in a portion of its RAM memory 56 dedicated to this purpose.

The portion of key RAM memory 56 dedicated to storing lockbox access log data can be larger or smaller than the portion of memory in the lockbox dedicated to this task. Typically, the dedicated key memory is at least as large as the dedicated lockbox memory (i.e. large enough to hold at least 100 access entries). A key can thus read several lockbox access logs, provided the total number of access log entries read does not exceed the key's capacity.

If a user attempts to read a lockbox that has more access log entries than the key has memory, the key will display a corresponding error message and will not execute the READ function.

Successful execution of the READ function does not cause the access log data in the lockbox to be erased. Instead, the data persists and is eventually overwritten by the lockbox itself, beginning when the one hundred and first log entry overwrites the first log entry. When the lockbox is later reinitialized and moved to a new listing, the access log data is dumped to a stand and the roll flag and pointer are reset to their initial states.

As noted earlier, if any lockbox access log data is stored in the key, the READ annunciator will be made visible when the key is awakened by the ON/CLEAR button so as to remind the user that one or more reads are stored in the key.

Read File Mark

READ FILE MARK is identical to the basic READ function except that only the lockbox access log entries since the last file mark are read.

Read NN

Lockbox CPU 28 maintains a lockbox access count in lockbox RAM memory 30 that indicates the number of OPEN, SBA and SIGNATURE functions that have been executed by the lockbox since it was reinitialized for that particular listing. In the preferred embodiment, this count is stored as a single eight bit byte and thus can count up to 255 accesses. When the READ NN function is selected and executed, lockbox CPU 28 transmits this lockbox access count to the key where it is displayed to the user in the message portion of LCD display 50.

This READ NN function allows the user to monitor listing activity at a glance, without downloading data from the key to a stand at a remote location. This function also allows a user to monitor lockbox usage so that the maximum memory capacity of the lockbox access log will not be exceeded and old data overwritten. For example, if the lockbox access log can store 100 entries and the user determines, by using the READ NN function, that there have been 90 accesses to the listing, the user may choose to then dump the contents of the log into the key for later relaying to a computer through a stand. By such operation, the old data in lockbox access log is preserved in the computer and up to 100 new entries can then be logged in the lockbox.

Clear Memory

The CLEAR MEMORY function clears both the portion of key RAM memory 56 dedicated to storing lockbox access log data and the portion of the key RAM memory dedicated to storing lockbox characterization instructions.

The lockbox access log data normally stays in key RAM memory 56 until the key is coupled to a stand and the data dumped to a computer. If, for some reason, the user does not want to preserve this data he can, instead of dumping it out to the computer, simply select the CLEAR MEMORY function and erase it.

The lockbox characterization instructions stored in key RAM memory 56 can variously stay in the key memory only until loaded into a lockbox or they can stay indefinitely, depending on the nature of the instructions (discussed below in the discussion of the PROGRAM function). If, for some reason, the user does not wish to preserve this data, the CLEAR MEMORY function can be selected to erase it.

Signature

The access log maintained in the lockbox is useful for reasons other than determining, for security purposes, who opened the lockbox. It is also desirable, for management information purposes, to be able to determine the identity of persons who entered the house without opening the lockbox.

Real estate agents often visit newly listed houses in large tour groups. The identity of the one agent in the group that opens the lockbox is of course entered in the access log. The identity of the other agents in the group could also be logged in the access log if they were also to open the lockbox. However, the OPEN function draws a considerable amount of power from the battery. Consequently, it is desirable to be able to log the identity of agents without requiring them to open the lockbox. The SIGNATURE function performs this task.

Agents who select the SIGNATURE function can engage their keys with the lockbox and have their identities logged in the access log. The lockbox treats this function as an OPEN operation, but omits the final step of energizing the solenoids. Consequently, the power drain is negligible. By use of this function, the system is better able to maintain detailed information on visitors to a listed property.

The SIGNATURE mode has applications beyond real estate lockboxes. For example, a night watchman at an industrial complex could use the SIGNATURE function to log the date and time of his visits to the various locks around the complex without opening any such locks. A record could thus be maintained of the surveillance activity at various sites around the premises.

Shown By Arrangement

SHOWN BY ARRANGEMENT (SBA) is a function that allows a listing agent to restrict which other agents are allowed access to certain listed properties.

Certain homeowners do not wish every agent in a real estate board to be able to gain access to their homes. They have placed their trust in one listing agent and want only agents authorized by that agent to show the house. However, it is impractical for the listing agent to be present at each such showing. The Shown By Arrangement feature of the present invention allows the listing agent to program the lockbox to require that a second code, an SBA code, be entered before access to the house key is granted.

The SBA function is activated by specifying a desired four digit SBA code in the lockbox characterization instructions. If no SBA code is specified, a default value of 0000 is stored. When an agent tries to access a lockbox for which a non-zero SBA code has been specified, he or she must do so by first selecting the SBA function. When the key is so armed in the SBA mode, the agent is then prompted to select one of two functions from the prompt field: OPEN or CHANGE SBA.

If the OPEN function is selected, a "SBA" message is displayed in blinking form in the LCD display, prompting the agent to enter the SBA number. The agent then enters the four digit SBA number and corresponding asterisks appear in the LCD display. After the code is entered, it is transmitted to the lockbox with the request to execute the OPEN function. If the SBA code entered matches the SBA code stored, and if other authorization criteria discussed below are met, the function is executed. If the SBA code entered does not match the SBA code stored, the function is immediately denied.

The second option after arming the key in the SBA mode is to change the SBA number. (When the key is armed in the SBA mode, a CHANGE prefix is made visible in LCD display 50 next to the SBA prompt to permit selection of the CHANGE SBA function). This option can only be executed by the listing agent, the listing agent's broker or the listing agent's board. The lockbox checks that the identity of the key corresponds to one of these entities by comparing key identifying data sent from the key with the lockbox identifying data stored in lockbox RAM 30.

When the CHANGE SBA function is selected, a "NEW" message appears in the key LCD display 50 in blinking form, requesting the user to enter the new SBA number. Again, like changing the four digit personal code, this new SBA number must be entered twice in order for the change to be effected.

Program

The PROGRAM function transmits a set of limited characterization instructions from a key to a lockbox to effect a reprogramming of the lockbox in the field. Key CPU 52 will not make visible the PROGRAM prompt nor permit selection of the PROGRAM function unless the CPU has earlier determined that the key contains a set of limited lockbox characterization instructions waiting to be downloaded into a lockbox.

The lockbox programs that can be loaded into the key from the computer in the exemplary embodiment can be of two types: Specific Update and Blanket Update. Specific Update is used when a set of lockbox characterization instructions is destined for one particular lockbox, identified by that lockbox's serial number. Once the program has been downloaded to that lockbox, key CPU 52 automatically erases it from key RAM memory 56. Specific Update is generally used to change a lockbox's Daily Disable times and to set data switches enabling Privacy Read and Privacy Shackle Release (discussed below in the section entitled Programmable Lockbox Options).

Blanket Update, in contrast, is used when a set of lockbox characterization instructions is destined for a group of lockboxes. Downloading the instructions to a lockbox does not erase the instructions from key RAM 56. Instead, the instructions persist in the key until erased by the CLEAR MEMORY key.

Blanket Update is generally used to recharacterize lockbox instructions on an agency- or board-wise basis. Blanket Updates generally fall into two classes: those that update the lockout list and those that reprogram the identity of the lockbox's listing agent.

Both Specific and Blanket Updates are transferred to the lockbox by using the PROGRAM function. The difference between the two is an update type data string included with the key programming instructions which indicates whether the update is a Specific Update or a Blanket Update, and, if it is a Blanket Update, whether it updates the lockout list or the listing agent.

In the preferred embodiment, the programming of the lockbox by the key in the field is limited so that only certain of the lockbox characterization instructions can be reprogrammed by the key. In the exemplary embodiment only the Lockout List data, the SBA number, the Daily Disable times and the listing agent identity can be reprogrammed in this manner, as is indicated in FIG. 13. The other data, such as the house, board and agency identification data and the lockbox access codes, cannot be changed by the key. To change this restricted data, the illustrated lockbox must be returned to a stand for reprogramming directly by a computer.

The memory map of FIG. 13 illustrates that separate portions of key RAM memory 56 are dedicated to storing lockbox characterization instructions and copies of lockbox access logs. In other embodiments, a single portion of key RAM memory 56 can be shared for these purposes.

PROGRAMMABLE KEY OPTIONS

The instructions needed to implement the following key options are provided with the key control software stored in key ROM 64. These options are then individually enabled or disabled by setting appropriate enable/disable bits stored in key RAM 56 with the key characterization instructions.

Key Expiration Date

To enhance security of the system, some or all of keys 14 can be programmed to "expire" (become disabled) after a predetermined number of days. By this technique, keys that are lost or stolen lose their utility in a relatively short time.

In RAM memory 56 of key 14 is data corresponding to a julian expiration date on which the key is to expire. Before any functions requested by the key are authorized, key CPU 52 first compares this expiration date with data received from the calendar-clock portion of lockbox CPU 28 indicating the current date. If key CPU 52 determines that its expiration date has passed, the requested function is denied. A signal is sent to lockbox 12 informing lockbox CPU 28 of the expired key for logging in the lockbox's diagnostic maintenance log (discussed below in the section entitled Diagnostic Features). A corresponding entry is made in the key's diagnostic maintenance log. The key then displays an error message indicating an expired key in the message portion of key LCD display 50. After the message has been displayed for a predetermined period of time, the key reverts to its sleeping state.

This expiration date feature significantly enhances system security without imposing any significant burden on users of the system. Expired keys can be "rejuvenated" by an appropriate authority, usually the supervising real estate board, by simply loading a new expiration date into key RAM 56 via a stand.

The present expiration feature also offers the supervising board and the individual users considerable operational flexibility. For example, the board can set a key to expire on any desired date. A key can thus be programmed to expire in a day, a week, a year or never, in increments of one day. (To program the key to never expire, this function is simply not enabled). This flexibility also enables the board to set different expiration dates for different keys. For example, it may wish the keys of new agents to require rejuvenation every two weeks, those of established agents to require rejuvenation every two months and those of brokers to require rejuvenation only every two years. The expiration dates of the various keys can also readily be staggered so that all the keys in the system will not need to be rejuvenated on the same day. The system offers flexibility to users in that a key can be rejuvenated before it expires. A key owner can thus rejuvenate a key at a time when it is convenient, rather than at a time dictated by the lockbox owner.

Key Deactivation

Key 14 can selectively be deactivated to disable its further use by setting an appropriate disable bit in key RAM 56. This is useful when, for example, a board or an agency wishes to store unused keys. After being deactivated, key 14 must be reinitialized with new characterization instructions from the board or other supervising authority before it can be used again.

PROGRAMMABLE LOCKBOX OPTIONS

The instructions needed to implement the following lockbox options are provided with the lockbox control software stored in lockbox ROM 44. These options are then individually enabled or disabled by setting corresponding enable/disable bits stored in lockbox RAM 30 with the lockbox characterization instructions.

Daily Lockbox Disable

Oftentimes, homes listed by real estate agents are not vacant. The current owner may still be residing in the house and may not welcome visitors at certain hours. For example, a homeowner may work in the evenings and sleep during the days and consequently wish that his house not be shown between the hours of 7:00 a.m. and 3:00 p.m. To accommodate such homeowners, CPU 28 of lockbox 12 can run a software routine, stored in lockbox ROM memory 44, that disables the lockbox from opening during certain hours of the day. The daily lockbox disable software routine operates in conjunction with the calendar-clock portion of lockbox CPU 28 and with programmable time data indicating the desired beginning and end times of the daily lockbox disable period. These beginning and end times are loaded into lockbox RAM memory 30 with the lockbox characterization instructions and can be loaded by an appropriately programmed key 14.

In the preferred embodiment of the present invention, lockbox CPU 28 is programmed to correct its internal calendar-clock data automatically to account for time changes brought on by daylight savings time so as to maintain the desired daily disable times. Similarly, the calendar-clock portion of lockbox CPU 28 also corrects itself for leap years.

Lockbox Disable On Removal

After a real estate agent has released a lockbox shackle, the lockbox could normally be reinstalled on another house. Before such installation, however, the lockbox should be be reinitialized and loaded with a variety of new characterization instructions identifying the new listing, the listing agent, the listing agency, etc. In certain embodiments, this recharacterization could be accomplished by loading a key 14 with all of the new instructions and loading the lockbox from the key using the PROGRAM function.

In most systems, however, this field reprogramming procedure is undesirable. It does not guarantee that the characterization instructions loaded by computer 18 into key 14 are actually transferred into the lockbox. More importantly, it does not guarantee that the access log data stored in the lockbox is recovered and relayed back to the computer for archival purposes.

In systems where data integrity is important, it is desirable that the lockbox be read and programmed directly by the computer without the use of an intermediate key. To insure that this is done, a Lockbox Disable On Removal feature is selectably provided.

When the Lockbox Disable On Removal feature is enabled by appropriate bits in the lockbox characterization instructions, the lockbox becomes disabled when the shackle is released. In this disabled state, the lockbox cannot be operated nor can it be reprogrammed from the key. It must be returned to a stand at a board or agency office for reprogramming. By requiring the lockbox be returned for reprogramming, the access log can be reliably read for archival purposes, thereby insuring the integrity of the board's lockbox database.

Lockout List

In certain instances, it may be desirable to lock out certain agents, or agents from certain agencies, and thereby deny them access to a listed property. In the preferred embodiment, RAM memory 30 of lockbox 12 contains a list of key identification data that, although the keys so identified may otherwise be authorized, are to be locked out. The identification data received from the accessing key is compared against this list by lockbox CPU 28. If the accessing key's identification data corresponds with data found in this list, lockbox 12 will refuse to execute any lockbox functions requested by the key.

In the preferred embodiment, there are three types of lockouts. The first type of lockout identifies specific agents that are to be locked out. The second type of lockout identifies specific agencies that are to be locked out.

The third type of lockout identifies a specific agency that is to be allowed access to the house key. Agents from all other agencies are to be locked out. By this third type of lockout, a house can be exclusively listed by a single agency so that only agents from that agency can show the house.

Each of these lockout functions is implemented by certain enabling data stored in lockbox RAM memory 30 with the lockbox characterization instructions. If any of these functions is implemented, the characterization instructions further include data specifying the identities of the agents or agencies who are to be locked out.

Lockout With Key Disable

As a further option on the lockout list function, lockbox CPU 28 can be programmed to disable certain locked-out keys that may attempt to execute a function on the lockbox. In the exemplary embodiment, lockbox CPU 28 responds to each such preidentified key with a special signal that instructs key CPU 52 to alter the key's four digit personal code in key RAM memory 56 by replacing certain digits of this code with hexadecimal digits (A–F) which are not included on the key's keypad 48. With the per son al code so altered, the user can no longer arm the key for use. The personal code can only be made usable again by reprogramming the key, which operation is usually only performed by the supervising real estate board.

Updating Lockout Lists

It will be recognized that the lockout list data stored in each lockbox may need to be updated frequently in order to be effective in locking out undesired keys. In one form of the invention, key 14 has a portion of its RAM memory 56 dedicated to storing a lockout list. Stored with this list is a date indicating the timeliness of the lockout list data. A date is also stored with the lockout list data stored in lockbox 12 indicating its timeliness. Whenever key 14 and lockbox 12 communicate, these dates are compared by key CPU 52 or lockbox CPU 28. If it is determined that the lockout list data stored in key 14 is "fresher" than that stored in lockbox 12, the key's lockout list data, including the date data, is transferred to lockbox RAM memory 30 where it overwrites the "stale" lockout list data previously stored there. If it is de termined that the lockout list data st ored in lockbox list 12 is "fresher" than that stored in key 14, the lockbox's lockout list data, including the date data, is transferred to key RAM 56 where it overwrites the "stale" lockout list data previously stored there. By this technique, one unit updates the other so that each has the newer lockout list data.

Privacy Read

Some listing agents, especially those who list expensive homes, may wish to prevent others from retrieving the lockbox access logs recorded in their lockboxes. These logs may reveal the identities of the agents within the real estate board whose clientele can afford expensive homes. This is useful information that the listing agent may not wish to share with other agents.

In order to maintain the privacy of this information, the lockboxes of the present invention can be programmed, by an appropriate bit in the lockbox characterization instructions, to allow only the listing agent, or that agent's broker or board, to retrieve the lockbox access log. If this enable bit is set, lockbox CPU 28 compares the identification data received from the key with its own lockbox identification data before allowing an otherwise authorized READ operation to be performed. Access to the lockbox access log can thereby be limited to this authorized class of keys.

Privacy Shackle Release

It is generally desirable to restrict execution of the SHACKLE RELEASE function to the listing agent, or to that agent's broker or board. To restrict execution of the SHACKLE RELEASE function in this manner, a Privacy Shackle Release function is provided. If this function is enabled, lockbox CPU 28 compares the identification data received from the key with its own lockbox identification data before allowing a SHACKLE RELEASE function to be performed.

Lockbox Deactivation

Lockbox 12 can selectively be deactivated to disable its further use by setting an appropriate disable bit in lockbox RAM 30. After being deactivated, lockbox 12 must be reinitialized with new characterization instructions from the board or other supervising authority before it can be used again.

DIAGNOSTIC FEATURES

Power-On Diagnostics

As soon as key 14 is awakened by pressing the ON/CLEAR button, a set of diagnostic routines is run to confirm proper operation of the key.

As a first check, key CPU 52 determines whether the "master software switch" is off. The master software switch is a flag in key RAM memory 56 that indicates whether the key's characterization instructions are corrupted. This switch is turned off every time a process of critical loading characterization instructions from a computer into the key is begun. The switch is not turned back on again until the transfer of instructions is completed without error. If, for example, the key is removed from stand 16 before the transfer is completed, the characterization instructions in key RAM memory 56 will be incomplete. Key CPU 52 recognizes this data corruption by noting that the master software switch is still off and accordingly prevents the key from attempting any operations until the characterization instructions are loaded correctly. (Provision is made for reloading new characterization instructions from a properly authorized computer through a stand even when the master software switch is off).

As a second check, key CPU 52 determines whether there is any button on keypad 48 that is stuck in the down position.

As a third check, key CPU 52 determines whether the key is in personal code timeout mode. Personal code timeout mode is the ten minute period following four unsuccessful entries of the personal code.

As a fourth check, key CPU 52 performs a non-destructive test on key RAM memory 56 to determine if it is malfunctioning.

If any of these four error conditions is detected, a corresponding error message is presented in the message of LCD display 50 for a five second period and the key then returns to sleep.

If none of the error conditions is detected, the key then examines the status of the key battery. If it needs to be replaced, key CPU 52 makes visible the KEY BATTERY annunciator for the remainder of the key's operations. If the key battery count (discussed below) is equal to zero, CPU 52 causes LCD display 50 to display the message "DEAD" for a predetermined period of time and then go to sleep.

If the diagnostic tests are run successfully, the key allows the user to proceed and enter the four digit personal code, etc.

Error Messages

The message display portion of the LCD display 50 can indicate up to 100 errors by displaying messages ER00 through ER99. The error codes are very finely detailed so that a user can determine quite accurately the nature of a problem by reference to the two digit code. Selected error conditions displayed in this manner include pushing a wrong button, dead battery, wrong personal code, key in personal code timeout mode, keyboard button stuck, master software switch off, etc.

Diagnostic Maintenance Log

Occasionally, a vendor or manufacturer may receive reports that a lockbox or key is malfunctioning. To aid in investigation of such reports, the lockboxes and keys of the present invention each have a portion of their RAM memories dedicated to storing detailed diagnostic information. In the preferred embodiment, detailed information on the last ten events noted by the lockbox or key microprocessor is stored in this "diagnostic maintenance log." Each diagnostic maintenance log entry identifies the events noted and the key or lockbox unit's response.

The diagnostic maintenance log entry of an exemplary OPEN operation in the key might be as follows. The key is energized by the ON/CLEAR button. If one of the Power-On diagnostics is failed, a corresponding entry is made in the diagnostic maintenance log. Assuming the Power-On Diagnostics are run successfully, the user is allowed to enter the four digit personal code. If the wrong code is entered or if no code is entered within the ten second time period, a corresponding entry is made in the maintenance log. Assuming the personal code is correctly entered, the user is next prompted to select a function. Again, if an error is made by the user in selecting a function or if the function selected is denied by the system, a corresponding entry is made in the maintenance log. This process of logging any error condition continues until the key returns to sleep.

Although not recited in the foregoing example, it should be noted that an interruption in the communications between a lockbox and key is an event that is always recorded as an entry in the diagnostic maintenance log.

Depending upon the requirements of a particular application, each CPU could be programmed to record data on all events, or only on those events that prevent the requested operation from being executed.

It will be noted that the lockbox access and diagnostic maintenance logs of the present invention serve two entirely different purposes. The lockbox access log serves as a record, for legal or management information purposes, of a narrow range of lockbox operations. The lockbox access log only logs OPEN, SBA, SHACKLE RELEASE, SIGNATURE and FILE MARK functions. It logs both successful and unsuccessful OPEN, SBA, SHACKLE RELEASE and SIGNATURE functions, but only logs FILE MARK functions if they are successful. If an unsuccessful function is logged, no diagnostic data indicating the reason for the failure is recorded. With each of these access log entries, however, the lockbox logs a variety of ancillary data, such as the date and time of the operation and the identity of the key requesting the operation.

The diagnostic maintenance log, in contrast, serves only as a diagnostic tool. It serves in this capacity for all lockbox or key operations, not just those four which are of concern to the lockbox access log. For each operation, it stores detailed diagnostic information. However, no time, date or identification data is logged.

Upon reports of a malfunctioning lockbox or key, the corresponding diagnostic maintenance log can be retrieved, either by sending the malfunctioning unit to the board for coupling to the board computer or by coupling the unit to the board computer through a stand 16. This data can then be evaluated to determine the cause of the malfunction.

Remote Testing

In addition to retrieving diagnostic maintenance log data from keysafes and locks for coupling to a computer, stand 16 further serves a diagnostic function by enabling a computer to conduct detailed testing on a malfunctioning lockbox or key unit. A lockbox or key that is malfunctioning can be put on a stand and the central board office computer called. The central computer can then run a collection of diagnostic routines and indicate to the user the cause of the problem. If the board's central computer is not able to diagnose the problem, the vendor or supplier of the equipment can run exhaustive diagnostic routines directly from its office to the unit on the stand at the remote location.

AUTHORIZATION OF LOCKBOX OPERATIONS

The determination of whether a key is authorized to operate a lockbox is made by comparing certain strings of data exchanged between the lockbox and key. An operation is only authorized if these data strings correspond to a specified degree. This process is explained in more detail below.

In the preferred embodiment, the exchange of signals between the key and lockbox comprises a multipart handshake. First, key 14 sends a first, interrogation signal to lockbox 12 to cause the lockbox to wake up from its sleeping state. Lockbox 12 responds by sending a second signal back to the key. This second signal includes lockbox battery condition data and date data (provided by the calendar-clock portion of CPU 28).

Upon receiving this data, key CPU 52 compares the received date data with the key expiration date stored in key RAM memory 56, as discussed earlier. If it is determined that the key is not expired, key CPU 52 then sends lockbox CPU 28 data identifying the key by agent, agency and board so that the lockbox can determine whether the requested function can be executed on the basis of an ownership match between the lockbox and key. Lockbox 12 has corresponding identification data, identifying its listing agent, agency and board, stored in its RAM memory 30. In order for lockbox 12 to authorize execution of the requested function on the basis of an ownership match, lockbox CPU 28 compares the key identification data received from the key with its own lockbox identification data to determine whether they correspond to a required degree. The degree of correspondence required between these groups of data before an operation is authorized is specified by "permission codes" stored in the key and sent to the lockbox with the key identification data.

Permission Codes

At one extreme, the permission codes may require only that the lockbox and key identification data indicate that the lockbox and key are assigned to the same real estate board in order for the lockbox to authorize the requested operation. At the other extreme, the permission codes may specify that even if the lockbox and key are assigned to the same board, agency and agent, the lockbox will still not authorize the requested function. In between these extremes, the permission codes may specify that the corresponding elements of board and agency identification data match, or; that the corresponding elements of board, agency and agent identification data match, before the lockbox will authorize a requested operation.

Three different permission codes are stored in key RAM memory 56 corresponding to three groups of lockbox operations. The first permission code specifies the degree of match required between the lockbox and the key identification data before an OPEN, SBA, change SBA or FILE MARK function will be authorized. The second permission code specifies the degree of match required between the lockbox and key identification data before the SHACKLE RELEASE function will be authorized. The third permission code specifies the degree of match required between the lockbox and key identification data before any of the READ functions will be authorized. (The remaining functions do not depend on permission codes for authorization. CHANGE PERSONAL CODE, CLEAR MEMORY and CONTROLLER are functions executed by the key alone, not in cooperation with a lockbox. SIGNATURE does not require any ownership match for execution. PROGRAM generally cannot be executed unless there is a match between the owner of the computer that loaded the programming instructions into the key and the owner of the lockbox.)

Each permission code can assume one of four values as follows:

4 Disabled

3 Requires board, agency and agent match

2 Requires board and agency match

1 Requires only board match

If lockbox CPU 28 finds the requisite match between the lockbox and key identification data, the lockbox authorizes and executes the requested function. If the lockbox CPU does not find the requisite match, the system then examines whether the function might be authorized based on an "access code" match.

Access Codes

If the requested function is OPEN or SBA, key 14 may authorize the function based on an access code match.

Both lockbox 14 and key 12 have at least one access code stored in their respective RAM memories. (In one form of the invention, up to fifteen access codes can be stored in each unit). The access codes stored in the lockbox are each three bytes long. A two byte field identifies the real estate board. A one byte field is arbitrary. The access codes stored in the key also contain a two byte field identifying the board and a one byte arbitrary field. The key access codes, however, each additionally contain an expiration date field. If the requested function is an OPEN or SBA function and if the function was not authorized by a permission-code specified ownership match, the lockbox transmits its access codes to the key for evaluation by key CPU 52.

After receiving the lockbox access codes, key CPU 52 compares each of the lockbox access codes with each of the key access codes stored in key RAM 56. If key CPU 52 finds a match, it then compares the expiration date associated with the matching key access code with the date data received earlier from the lockbox to determine whether the key access code involved in the match is nonexpired. If the code is nonexpired, the key sends the lockbox a signal instructing the lockbox to execute the requested OPEN or SBA function.

If none of the key access codes matches any of the lockbox access codes, or if only expired key access codes match lockbox access codes, the key sends the lockbox a signal instructing the lockbox not to execute the requested OPEN or SBA function.

Summarizing the procedure by which a function is authorized, if the requested function requires a permission code-specified ownership match and such match is found, the lockbox authorizes the requested function. If the requested function is an OPEN or an SBA and if the permission code-specified match is not found, the key can nonetheless authorize the function if any of the lockbox access codes match any of the nonexpired key access codes.

It should be noted that the particular function authorization process described above was adopted because it minimizes the amount of data transmitted between the lockbox and key units and because it made the most efficient use of the processing and memory capabilities of the respective units. However, the elements of data exchanged and the distribution of the decision making tasks between the two CPUs could readily be altered to meet the requirements of other applications.

Segmentation/Regionalization

The access code system of the present invention provides several capabilities that have been difficult or impossible to implement in prior art lockbox systems. One such capability is board segmentation and regionalization.

In a typical system, the arbitrary byte included in the lockbox and key access codes is used to segment or regionalize the properties listed by a real estate board into a variety of classes. For example, a board may deal in both residential and commercial properties, but not want residential agents to gain access to commercial listings and vice versa. In this case, the arbitrary byte in the lockbox access codes of the lockboxes installed on commercial properties could be set to "1" and the arbitrary byte in the lockbox access codes of lockboxes installed on residential properties could be set to "2." The keys of commercial agents would then be programmed to have an access code terminating in "1," while the keys of residential agents would be programmed to have an access code terminating in "2." With the access codes so set, residential agents would be prevented from gaining access to commercial properties and vice versa.

Inter-Board Cooperation

In addition to enabling real estate boards to segment and regionalize their listings, the access code system of the present invention also enables real estate boards to cooperate in the sales of properties. For example, Board A may wish to allow all agents from neighboring Board B to have access to a lockbox on a particular house within Board A territory in order to expedite its sale. To do this, Board A would add to this lockbox's access code list an additional access code comprised of two bytes identifying Board B, together with the one byte arbitrary field that is in general use by Board B. By so doing, Board A enables all agents from Board B to open the lockbox with their existing Board B keys.

Similarly, an agent (c) from Board C may wish to show a client houses listed for sale in neighboring Board D. To do this, agent (c) would call Board D and request that it load an access code into agent (c)'s key that matches the access code (or codes) resident in the Board D lockboxes to which agent (c) seeks access. (A board can only load a key with key access codes having that board's identifying two byte field). The loading of these access codes could be done by Board D's computer over telephone lines into agent (c)'s key via a stand, regardless of the distance between Boards C and D. Board D would doubtless also append an expiration date to the codes loaded into agent (c)'s key so that agent (c) could only access the properties in Board D for a limited period, such as a day or two.

Additional Information on Permission Codes

Like the access code system described above, the permission code system also gives the present invention capabilities that were difficult or impossible to implement in prior art lockbox systems. For example, the permission code system enables keys to be delegated different capabilities corresponding to the needs and privileges of different users.

As noted, each key is programmed with permission levels for three different classes of functions: OPEN/SBA, SHACKLE RELEASE and READ. In operation, the permission levels indicate the degree of ownership match required between a key and lockbox before the two units can cooperate to execute a function.

The different permission codes in a key are assigned independently of one another, so that a key can have one permission code for certain functions and different permission codes for other functions. This feature allows boards and agencies to vary the capabilities of their keys simply by reprogramming the permission codes stored with the key characterization instructions. Such specialized keys have several applications. For example, an agency may wish to hire a courier to visit various houses listed by the agency to retrieve the lockbox access logs. However, the agency may not want the courier to have access to the key compartments of any of these lockboxes. To limit the courier's capabilities in this manner, the agency puts the key in the stand and sets the permission codes for OPEN/SBA and SHACKLE RELEASE to 4. A permission code of 4 prevents the function from being executed, regardless of the degree of ownership match between the lockbox and key. The READ permission level is set to 2, which allows the key to read the lockboxes on all the houses listed by the agency. The courier can then go and retrieve data from all these lockboxes and yet be unable to gain access to any of the house keys.

As far as the permission levels are concerned, there is no distinction made between listing agents and nonlisting agents. A permission code of 3 is generally assigned to each. However, listing agents can perform significantly more functions at a lockbox than a regular agent. For example, listing agents can change the Shown By Arrangement code and can execute Privacy Reads. These privileges, however, are not granted by reference to permission codes in key RAM 56. Instead, such restricted functions are authorized only when CPU 28 or CPU 52 has confirmed that the key requesting execution of the function is owned by the listing agent associated with the lockbox (or that agent's broker or board). If no such match is found, the key owner is refused authorization to execute the listing agent functions.

Industrial Applications of Permission Codes

The permission code system of the present invention has applications in the industrial security market as well as in the real estate lockbox field. An industrial site can be tiered in a manner analogous to the agent, agency and board levels used in lockboxes. For example, an industrial site could be tiered into employee, building master and site master levels. The employees of a company could be assigned permission codes of 3, allowing them to unlock only the doors for which they are the responsible employees. Building security guards could be assigned permission codes of 2, allowing them to unlock all doors in the particular buildings for which they are responsible. Master security guards could be assigned permission codes of 1, allowing them to unlock all doors on the site.

Permission Codes and Computers

The permission code system of the present invention is also used with computers 18. Each computer is assigned a permission code that specifies which lockboxes and keys it can work with. If the computer belongs to an agency, it will be assigned a permission code of 2. A computer with a permission code of 2 can only be used to interface, through a stand, with keys and lockboxes assigned to that same agency. If the computer is owned by the board, it will be assigned a permission code of 1 and can be used to interface with all keys and lockboxes in the real estate board.

The permission code assigned to a computer also limits the authority it can delegate to a key. A computer can delegate different levels of authority to a key by the permission codes that it loads into the key with the characterization instructions. A computer can reprogram a key's permission codes to the computer's own permission code or to any more restricted level. For example, a computer owned by an agency can reprogram a key to have permission codes of 2, 3 or 4. Such a computer cannot be used to program a key to have permission code of 1, for this would be delegating authority to the key higher than the computer's own authority. A board level computer, due to its permission code of 1, can be used to program or read any lockbox or key owned by the board.

COMMUNICATIONS

Digital Reconstruction Modulation

As noted, communication between the lockboxes, keys and stands of the present invention is effected by electromagnetically coupled coils. In the prior art, exchange of data over coupled coils was effected by modulating the data signal onto an audio frequency or radio frequency carrier. Such electromagnetic coupling has previously been poorly suited for use in such battery powered applications because the modulated carrier draws a relatively large amount of power from the battery.

Figure 19:
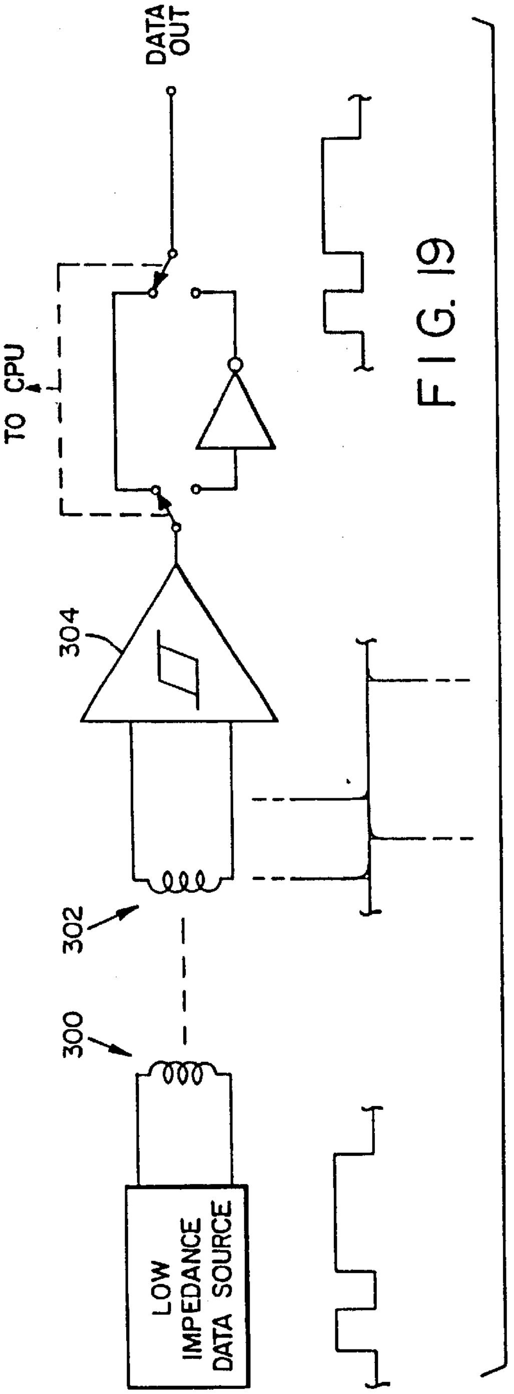
FIG. 19 is a schematic block diagram showing a digital reconstruction modulation system according to the present invention.

In order to minimize battery drain, the present invention employs a new modulation scheme, termed here "digital reconstruction modulation." In this system (FIG. 19), the raw data signal which is switching, for example, between zero volts and two volts, is applied directly across a first, transmitting coil 300. Across a second, receiving coil 302 is induced an alternating series of positive and negative transient voltage spikes corresponding to the transitions in the data signal. These transient voltage spikes are applied to a Schmidt trigger circuit 304. The Schmidt trigger circuit toggles states only when the voltage applied to its input is above a first threshold voltage or below a second threshold voltage. These threshold voltages are selected so that the positive transients exceed the first threshold voltage and so that the negative transients drop below the second threshold voltage. The positive transients thus cause the Schmidt trigger to toggle on and the negative transients thus cause the Schmidt trigger to toggle off. The output signal provided by the Schmidt trigger is thus identical to the data signal applied to the transmitting communications coil, reconstructed by virtue of the Schmidt trigger's hysterisis properties.

Depending on the relative orientation of the two communicating coils, a low to high data signal transition applied across the first coil may cause a positive or a negative voltage transient across the second coil. Thus, the data signal recovered by the Schmidt trigger may be the inverse of the data signal applied to the first coil. This detail can be taken are of by starting the exchange of data between system units with a known data string. If the CPU in the receiving unit detects that the known data string is inverted, it can cause the output from the Schmidt trigger to be inverted again, bringing the signal back to its proper condition, for the remainder of the communications. Alternatively, the problem of data inversion can be eliminated entirely by insuring that the communicating components are always coupled in the desired orientation.

One advantage of this digital reconstruction modulation is that the effective range over which the coupled coils can communicate is not, as in the prior art, determined by the current drawn by the transmitting coil. Instead, the strength of the received signal is dependent solely on the rise time and fall time of the input data signal and on the coefficient of coupling between the transmitting and receiving coils. The voltage induced in the receiving coil is proportional to the time rate of change of this input signal. Thus, limiting the current in the transmitting coil, for example by a current limiting circuit set to clamp the coil current at one milliampere, does not significantly reduce the communications range. Range is only limited by the switching speed of the component logic.

A second advantage is that the data transmission rate is not limited by the frequency of a carrier signal carrying the data. Again, the only limits imposed are by the switching speeds that can be obtained in the coil circuit.

Adaptive Communications

The maximum speed at which lockbox, key and stand components can communicate with one another varies as a function of temperature, component tolerances and component aging. In a worst case situation, one system component might be able to communicate at only one-third the speed of another component. Instead of using a communication speed that is certain to be within the capability of all system components (i.e. the lowest common denominator speed), the present invention employs an adaptive communications scheme that optimizes the communications rate for a particular pair of communicating components.

As noted earlier, communications between units are generally begun by the key sending an interrogation signal to wake up the lockbox. Before the lockbox responds with its response signal identifying the lockbox, reporting on battery state, etc., as discussed earlier, the two units first agree on a data transmission speed.

To set the data transmission speed, each unit sends the other its shortest data element. In the present invention, a data 0 is represented by a signal duration of a first period and a data 1 is represented by a signal three times longer. To set the data transmission speed, the key thus sends to the lockbox a data 0 at the key's top speed. Lockbox CPU 28 measures the duration of this signal and stores this value in its RAM memory 30. Lockbox CPU 28 then sends the key a data 0 signal at the lockbox's top speed. Key CPU 52 in turn counts the duration of this signal and stores this value in its RAM memory 56. CPUs in both units then compare the duration of the signal received with the duration of the signal they sent in order to determine which unit is operating more slowly. The CPU in the faster unit then reduces its data communications speed in order for the length of its data 0 to match that of the slower unit. (The speed at which each unit transmits is set by a data word in the unit's RAM memory, which word can be altered by the CPU to effect the speed change). By this technique, the two units adapt to operate at the highest speed that both units can manage.

After two communicating units agree on a data transmission speed, they then exchange bits of data, such as the data 0 signal, alternately, approximately 20 times, in order to confirm that a reliable communications link has been established. If these twenty exchanges of data 0 signals are completed without interruption, the communications link is considered to be reliable and the exchange of function authorizing data between units is begun.

BATTERY SYSTEMS

A comprehensive battery monitoring system is employed in the present invention to prevent the lockbox and key batteries from failing and rendering the associated units inoperative. The battery monitoring systems rely on three independent criteria to determine when each battery is nearing the end of its useful life: elapsed time, usage and current drain from the backup battery. When the lockbox or key CPU detects either of the first two of these three low battery criteria, it loads a battery count number, such as 16, in its memory. (When the CPU detects the third low battery criteria, it immediately loads a battery count of zero in its memory). This battery count number is then decremented each time a lockbox or key operation is performed. The battery count represents the number of additional operations that the lockbox or key will perform before it curtails operation.

If the lockbox battery is low, the key informs the user of this condition just before the key returns to sleep. Each time the lockbox and the key communicate, the lockbox indicates to the key the status of the lockbox battery. If any of the three low battery criteria have been met, the lockbox relays the lockbox battery count to the key, which in turn displays this number in the message portion of its LCD display 50 and makes visible the KEYSAFE BATTERY annunciator in the top portion of the LCD display. The key then beeps to call the user's attention to the display. The number displayed in LCD 50 is the number of additional lockbox operations that the lockbox will allow before it curtails activities to prevent battery failure. The key maintains this LCD display for approximately two minutes before going to sleep.

In alternative embodiments, the lockbox battery count is not displayed on the key's LCD display. Instead, the KEYSAFE BATTERY annunciator and the beeper alone are used to warn the user that the lockbox will soon curtail its operations. By not informing the user of the precise number of lockbox operations left, it is hoped that the user will replace the lockbox battery without delay.

If the key battery is low, the user is reminded by the KEY BATTERY annunciator. Each time the key is powered on by the ON-CLEAR button, key CPU 52 examines the portion of key RAM memory 56 in which the key battery count is stored. If key CPU 52 finds a count, the count is decremented and the KEY BATTERY annunciator is made visible and remains visible for the duration of the key's operation.

For expository convenience, the following discussion of the three low battery criteria focuses on the lockbox battery monitoring system. The key battery monitoring system is analogous.

First Low Battery Criterion

The first low battery criterion is elapsed time. When a new battery is installed in the lockbox, a date counter is started that increments each day or other set period. The first low battery criterion is met when this count reaches a predetermined value, such as three years. That is, the system presumes that the lockbox battery is nearing the end of its useful life when it is three years old.

The predetermined time period at which the battery is assumed to be nearing the end of its useful life can be chosen to correspond to the particular circumstances of the lockbox. For example, if the lockbox is used in a cold environment, such as in Alaska, its "shelf life" will be longer than if it is used in southern Florida. Similarly, the predetermined period can be chosen to correspond to the type of battery installed. If alkaline batteries are used, the predetermined period would be set to a longer period than if conventional carbon batteries are used.

Replacement of the primary battery in the unit is detected by lockbox CPU 28 which monitors the voltage of the primary battery. When this voltage is interrupted and then restored, lockbox CPU 28 assumes that the battery has been replaced and resets the date counter accordingly. In an alternative embodiment, lockbox CPU 28 is informed of the removal and subsequent replacement of a primary battery by a microswitch positioned in the lockbox battery compartment.

Second Low Battery Criterion

The second low battery criterion is battery usage. When a new battery is installed in the lockbox, a battery capacity number is stored by lockbox CPU 28 in RAM memory 30. This number represents, very conservatively, the total estimated capacity of the battery. Each time an operation is performed, this number is decremented by a number representative of the energy actually consumed. The second low battery criterion is met when this battery capacity number reaches zero.

The battery capacity number loaded into RAM memory 30 when the battery is replaced could again be chosen to correspond to the particular circumstances of that lockbox. For example, if the lockbox is used in a cold environment, its battery will be less able to deliver successive large current loads than if it is used in a warm climate.

The amount by which battery capacity number is decremented is a function of the particular operations performed and their duration. In an exemplary lockbox system, the operations can be grouped into three classes: operation of a pair of locking solenoids, operation of the communications coil and operation of the remainder of the circuitry. Each of these operations is considered by lockbox CPU 28 to consume energy at a fixed rate. A pair of locking solenoids may be considered to consume energy at a rate of 3 watts, the communications coil at a rate of 5 milliwatts and the remainder of the circuitry at a rate of 1 milliwatt. Each time any of these operations is performed, CPU 28 operates a corresponding timer to measure its duration. The measured duration of each operation is multiplied by its assumed energy consumption rate to estimate the amount of energy actually withdrawn from the battery. These measures of energy usage are then subtracted from the battery capacity number stored in RAM memory 30 to provide an indication of the battery energy remaining. As noted, the second low battery criterion is met when this battery capacity number is decremented to zero.

In an alternative embodiment, the second low battery criterion is simply the number of operations performed by the lockbox. When a new battery is installed, a second counter, this one an operations counter, is started. This operations counter counts the number of high power operations (i.e., lockbox operations that energize solenoids, such as OPEN and SHACKLE RELEASE) performed by the lockbox. The second low battery criterion in this alternative embodiment is met when this operations counter reaches 1000. That is, the system presumes that the lockbox battery is nearing the end of its useful life after 1000 high power operations have been performed.

Third Low Battery Criterion

Both of the above two low battery criteria assume that the battery installed is new and functioning properly. However, in the event that a used or faulty battery is installed, a third low battery criterion is considered. The third low battery criterion is current drain from the backup battery.

Normally, no current is drawn from lockbox backup battery 34. The backup battery only supplies current when primary battery 32 is not able to meet all the lockbox's power requirements. When lockbox CPU 28 detects that current is being drawn from backup battery 34, this third low battery criterion is met and the system presumes that the primary battery is at the end of its useful life. In this instance, unlike the preceding two, the battery count number is immediately set to zero so that any energy remaining in the primary battery can be preserved for a SHACKLE RELEASE operation.

Additional Details on Battery Systems

As noted, once either of the first two low battery criteria has been detected, a counter is set to an arbitrary number, such as 16, and is decremented each time an additional lockbox operation takes place. This count begins at a relatively low number, such as 16, rather than at a higher number because if the number is too high, users will likely ignore it for too long.

In alternative systems, the battery count could increase. However, it has been found that users rarely remember what the top number is, but always know what zero means.

If the lockbox battery count reaches zero (or is set to zero by detection of current drain from the backup battery), OPEN and SBA functions are denied to everyone except keys owned by the board itself, as determined with reference to a permission code of 1 in the key. At this point, the lockbox is of little utility. Other operations are similarly prevented, such as FILE MARK, SBA and change SBA. However, the remainder of the functions, including SHACKLE RELEASE, can still be performed, thereby allowing the listing agent (or the listing agent's broker or board) to remove the lockbox and replace the batteries. In the preferred embodiment, after the lockbox battery count reaches five, the lockbox control software will only allow the listing agent (or the listing agent's broker or board) to execute the OPEN or SBA function.

The low battery criteria and associated numerical constants discussed above are selected so that even when the battery count reaches zero, the battery still has approximately half of its capacity left. This reserve capacity insures that the high power SHACKLE RELEASE function can still be performed. The lockbox battery capacity is prevented from draining much below this point by preventing high power OPEN functions.

Backup Battery Monitoring

In one form of the invention, the backup batteries in the lockbox and in the key are also monitored so as to determine when they are nearing the ends of their useful lives. In an exemplary embodiment, each lockbox and key includes a software timer that counts the time elapsed during which the backup battery is the sole power source for the unit, such as when the primary battery has been removed. When this timer reaches a predetermined count, an appropriate warning message is displayed in the message portion of key LCD display 50 indicating that the appropriate backup battery should be replaced.

In alternative embodiments, more complex backup battery monitoring schemes, such as those used with the primary batteries, can be employed.

RADIO UPDATING

In one form of the invention, data in lockboxes and keys throughout the real estate board can be updated by radio. By this technique, both board-wise changes of data, such as changes of lockout lists and access codes, and changes targeted to specific units, such as disabling a particular key, can be implemented simply and quickly.

For expository convenience, the following discussion focuses on radio updating of lockboxes. However, an analogous system can similarly be employed for radio updating of keys.

In systems employing radio updating, the data to be loaded into the memories of the lockboxes is modulated onto a subcarrier transmitted with a conventional FM broadcast. The source of the data can be a conventional modem driven from board computer 18. A receiver in each lockbox decodes this data from the modulated subcarrier and reloads its memory according to these instructions.

Figure 20:
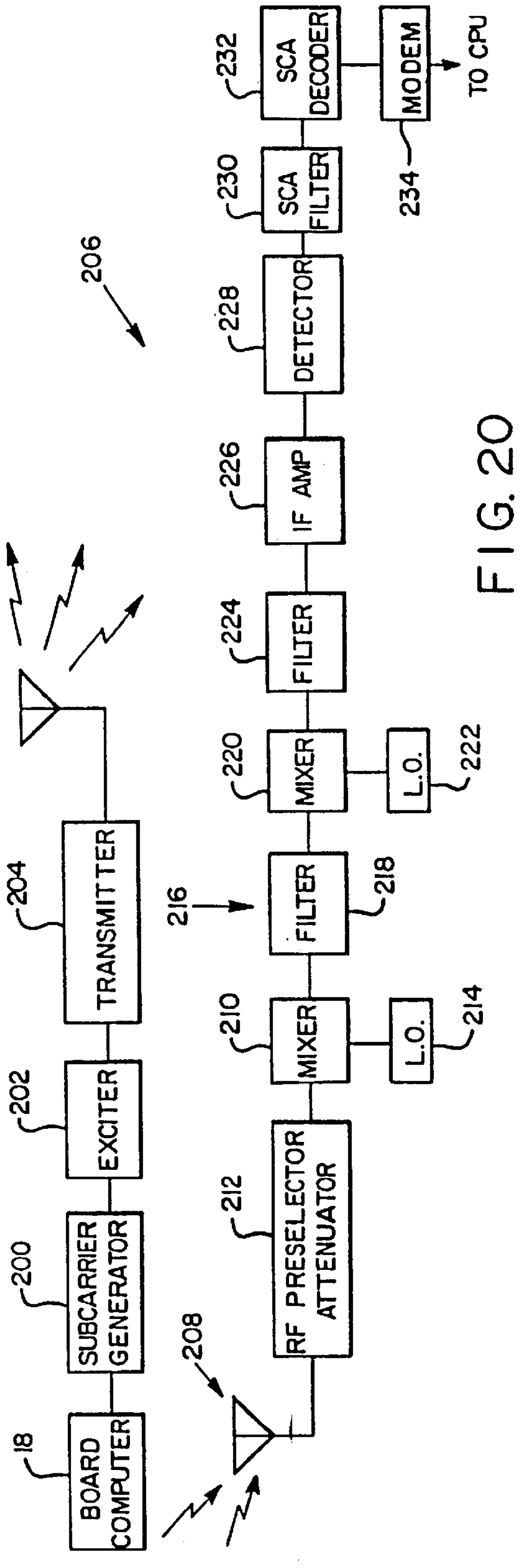
FIG. 20 shows a radio system for updating lockboxes and keys according to the present invention.

In more detail, the signals broadcast by FM stereo radio stations have a bandwidth of 200 kilohertz, 100 kilohertz on each side of the carrier frequency. The FM stereo audio and stereo pilot occupy the spectrum from the carrier frequency out 53 kilohertz each side. The portion of the spectrum from 53 to 100 kilohertz on either side of the carrier is vacant and is presently being used for a variety of other subcarrier services, such as transmission of commercial free music, educational materials and stock market reports. In the present invention, the data from board computer 18 to be sent to the individual lockboxes is modulated on a subcarrier positioned at 76 kilohertz in the FM baseband signal, approximately midway in this vacant range of frequencies. Referring to FIG. 20, the digital data from the board computer 18 is provided to a subcarrier generator 200 connected to an exciter 202 of the FM transmitter 204. The subcarrier generator generates the 76 kilohertz subcarrier signal which is modulated with the data.

This modulated FM signal is received by a receiver 206 in each lockbox. The received FM signal is fed from an antenna 208 (discussed below) to a mixer 210 through an RF preselector/attenuator circuit 212. RF preselector/attenuator circuit 212 provides some attentuation of out of band signals while amplifying the desired signals, thereby minimizing the receiver's noise figure. Mixer 210 mixes the desired FM broadcast signal received by antenna 208 with a local oscillator signal from a local oscillator 214. The frequency of local oscillator 214 is selected to produce an up-converted first intermediate frequency (IF) of 384 megahertz.

The output from first mixer 210, including the 384 megahertz IF, is fed to an IF section 216. IF section 216 includes a first filter 218 which passes the desired 384 megahertz signal and rejects the unwanted mixer products. Filter 218 desirably comprises a surface acoustic wave filter. The output from filter 218 is fed to a second mixer 220. Second mixer 220 mixes the signal from filter 218 with the signal from a second local oscillator 222. Second local oscillator 222 provides a 394.7 megahertz signal, thereby yielding a down-converted second receiver intermediate frequency of 10.7 megahertz. The output from second mixer 220 is fed to a second filter 224 which attenuates the undesired mixer products and passes the 10.7 megahertz signal to IF amplifier circuit 226. Second filter 224 can be a standard 10.7 megahertz ceramic filter of the type commonly used in FM receivers.

IF amplifier 226 amplifies the 10.7 megahertz signal from filter 224 to a level suitable for detection by a phased lock loop detector circuit 228. Detector 228 demodulates the IF signal and provides a wideband composite audio signal to an SCA band pass filter 230. SCA band pass filter 230 passes the desired subcarrier channel to an SCA decoder 232, while attenuating the lower frequency audio components. Decoder 232 demodulates the filtered SCA channel and provides the demodulated audio to a modem circuit 234 that converts the modem signals originally encoded on the subcarrier back to digital data form. The output from modem 234 is treated just as any other data input to the lockbox, as for example through the communications coil, and is used to effect the reprogramming of the lockbox RAM memory 30.

In certain embodiments, antenna 208 can include lockbox shackle 22 as its principal component. In such cases, shackle 22 is insulated within the case to prevent it from contacting the lockbox's electrical ground and is similarly insulated outside the case, as by an insulating vinyl rain guard enclosing the shackle, to prevent it from contacting the structure to which is is fastened. Although the shackle is a small antenna, it can be resonated by preselector/attenuator circuit 212 so as to operate as a low impedance resonant antenna at the frequency of interest.

In some lockbox mounting positions, such as on a grounded water faucet, the electrical coupling between the shackle antenna and ground may be sufficient, despite any intervening insulation, to reduce the strength of the received signal to a point at which it cannot be decoded reliably. Accordingly, it is often desirable to use an antenna that does not include the shackle as a principal element. Such an antenna may take the form of a planar coil encased in plastic and mounted on an exterior surface of the lockbox. Such an antenna can also be used on or in a radio-updated key.

In still another form of the invention, antenna 208 can comprise an insulated conductor wound about shackle 22 so as to form a helically loaded loop.

Because the radio updating process involves alterations to the lockbox memory, it is desirable that the updating not be interrupted by requests from keys to operate the lockbox. Consequently, it is desirable that all lockbox updating be done between the hours of midnight and 6:00 a.m., a period during which the lockboxes would not normally be in use. Each lockbox can be programmed to energize its receiver circuitry for this or any other predetermined period every night to listen for updates from the board office. This window period can be a few minutes long or a few hours long. Data sent from the central board office can be directed to all the lockboxes, or can include an introductory address data string identifying a particular lockbox to which the data is targeted. In either event, the transmissions from the board office can additionally include a reference time signal so that all lockboxes are synchronized in their operations and so that they will activate their receivers at the same time every day.

By using such a radio updating approach, maintenance of lockbox and key data is greatly facilitated and system performance is thus enhanced.

SYSTEM MANAGEMENT

Some large real estate boards have tens of thousands of lockboxes and keys in their systems, so an integrated management system is virtually essential. In one embodiment of the invention, a multiuser, multitasking system with large amounts of on-line storage is resident at the board office and serves as board computer 18. A super microcomputer such as the NCR Tower system is a suitable machine.

As shown in FIG. 21, a computer system for a large real estate board desirably includes a trunk interface unit 94 and a plurality of telephone lines 96 to allow a plurality of remote stands 16*b* (not shown) to interface with the super microcomputer simultaneously. In the preferred embodiment, up to eight telephone lines are used. Trunk interface unit 94 thus allows super microcomputer 18 to be interrogated over telephone lines (using DTMF tones) and allows data to be exchanged between the super microcomputer and individual lockbox and key components via stands 16. In such capacity, stands 16 function as remote input/output ports for the board computer and the stands' microprocessors function as smart input/output controllers.

In the preferred embodiment, trunk interface unit 94 includes an interface module 99 associated with each telephone line 96 for decrypting incoming data and for encrypting outgoing data. Modules 99 also desirably include speech synthesizers so that synthesized speech corresponding to various computer data can be sent back to individual agents over the telephone lines. A ninth interface module 99, which does not include a speech synthesizer, is provided in trunk interface unit 94 for interfacing with a local stand 16*a* resident at the board office.

Board computer system 18 also desirably includes at least one phone line 98 and an associated data modem 97 for interfacing to smaller computers 18 resident at individual agency offices.

In a typical large system, several smaller computers 18 are distributed throughout the system. Normally, such smaller computers are limited to performing certain preselected functions. For example, the software loaded into a small computer 18 at an individual agency typically enables it to update certain lockbox parameters, such as changing the lockout list and changing the daily disable times, but prevents it from changing more sensitive parameters, such as lockbox access codes. Similarly, the software loaded into the small computer 18 at the agency typically enables it to deactivate keys, but prevents it from reinitializing keys after they are deactivated and prevents it from changing key expiration dates and expired key access codes. Such restricted functions can only be performed by the central board computer.

The board computer is used to keep track of all data pertinent to the system. Whenever a key or a lockbox is read or programmed, the corresponding data is entered into a system database. This database includes information on all the features and parameters heretofore mentioned, for every lockbox and key in the system. The board computer can search the database for any category of information and can generate corresponding written reports on any such subject. By such reports, the board can better target its activities. For example, the board can search the database to determine which listed properties have not been shown often and then suggest to the member agencies that the advertising of these properties be increased. Similarly, the board can monitor manpower trends and suggest staffing schedules that allocate agents to the offices and at the times that the demand is greatest.

The above described system offers many advantages to real estate boards that span large territories. For example, keys 14 are usually programmed to expire occasionally and must be rejuvenated. This is desirably done by the real estate board, rather than by the individual agencies, so as to maintain centralized control over key usage. Accordingly, as noted, most small computers resident at the various agencies are not able to rejuvenate expired keys. The agents could travel to the board office periodically to have their keys rejuvenated, but in large metropolitan areas this may be burdensome. The present system allows agents to complete all such transactions with the board computer over telephone lines. To rejuvenate an expired key, for example, the agent would place the key on a stand 16 and would call the board computer. The key could then exchange appropriate handshaking signals with the computer and receive from the computer the key characterization instructions needed to rejuvenate the key.

In addition to enabling the board computer to communicate with smaller agency computers, phone line 98 also permits the board computer to communicate with the vendor. Updated software can be reloaded using this link. Other diagnostic routines, such as one for analyzing a diagnostic maintenance log stored in a lockbox or a key, can be executed by the vendor on individual components by using this link to couple through the board computer to the individual components at local board or agency offices.

The board computer includes several security features. For example, all requests for service to the computer must include proper password codes before any transactions are allowed. Certain particularly sensitive transactions may require that a user call the board computer, send appropriate passwords and then hang up. The board computer then calls the user back on a predetermined telephone line. By this and other techniques, security of the system can be maintained even if the security of the password codes is breached.

As will be recognized from the above discussion, the addition of a centralized board computer and its associated equipment greatly increases the system's utility and provides large real estate boards with a versatile, comprehensive and integrated lockbox management system.

Initialization and Deactivation of Lockboxes and Keys by the Computer

When the lockboxes and keys of the present invention are initially shipped from the vendor, they are not assigned to one particular real estate board. That is, the board identifying data portion of each unit's RAM memory is left unprogrammed. This field is later programmed automatically when the unit is initialized by a computer.

Both the lockboxes and the keys of the present invention include a bit, termed here the "free agent bit," in their respective RAM memories that indicates whether the unit has been assigned to a particular board. This bit is initially set to "0" by the manufacturer, indicating that the unit is unassigned.

When the unit is received by the purchaser, it is placed on a stand and initialized by an initialization routine run on a computer coupled to the stand. One of the first operations performed by this initialization routine is to determine the status of the unit's free agent bit. If it is found to be "0," the routine automatically stores in the unit's RAM memory a string of data identifying the board to which the computer itself is assigned. The computer then changes the unit's free agent bit from a "0" to a "1," thereby preventing subsequent changes of the lockbox's or key's board ownership. By this technique, every lockbox and key is assigned automatically to the board to which the programming computer is assigned.

After the lockbox or key is assigned to the initializing board, as described above, the initialization routine in computer 18 continues by loading the unit's RAM memory with characterization instructions as specified by the programming entity, usually the real estate board.

After a lockbox or key has been initialized, it can then only be reprogrammed by computers assigned to the same board. If it is desired to transfer a lockbox or a key to a different board, the original owner must deactivate the unit and change the unit's free agent bit back to "0." Thereafter, the unit will again assume the board ownership of the computer that reinitializes it.

Fraud Deterrence

The database in the board's central computer 18 includes data identifying each lockbox and key in the system and its operational status (initialized, deactivated, etc.). This data is used by the computer to prevent keys from being fraudulently duplicated.

As noted, each key includes identification data indicating the key's ownership by agent, agency and board. Computer 18 will not load a key with a set of identification data if it determines that a key having that particular set of identification data already exists. The system thus prevents an unscrupulous user from reprogramming his or her key so as to fraudulently assume the identity of another agent in the board. The only way an unscrupulous agent could perpetrate this fraud would be to first obtain possession of the other agent's key and to deactivate it. This function, however, cannot generally be executed without knowledge of the other agent's personal code, which the unscrupulous agent should not know. Thus, it will be recognized that the database's tracking of data on each key in the system serves an important role in deterring fraud.

Mechanical Construction of Lockbox

Figure 6:
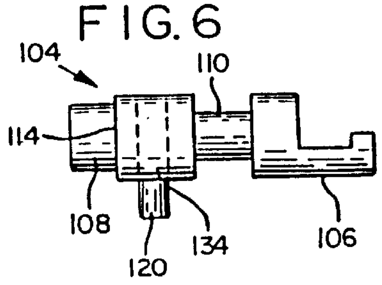
FIG. 6 is a right side view of a door stem used in the lockbox of FIGS. 2 and 3.

With reference to FIG. 3, lockbox 12 includes shackle 22, case 100 and a hinged key compartment door 24. Door 24 is retained in the closed position by a cooperating door latch 102 and door stem 104. Door stem 104 is shown in FIG. 6 as including a hook portion 106, a butt portion 108 and a turned cut portion 110. Stem 104 is spring biased away from the back of case 100 by a spring 112 compressed between case 100 and a shoulder 114 on stem 104. Door stem 104 is retained in the locking position by the plungers 116, 118 of key compartment locking solenoids 36 (FIG. 2) which engage stem 104 at turned cut portion 110 and limit its forward travel.

When it is desired to open door 24, the door is pressed inwardly. This causes door stem 104 to move towards the rear of the case. This freedom of movement of stem 104 is provided by the length of turned cut portion 110, which allows the stem to move inwardly while still engaged with the extended solenoid plungers.

After door stem 104 has been moved inwardly a distance, a retaining pin 120 is urged against a pivoted lever 122. Lever 122 pivots about a pivot point 124 connected to the case, thereby causing the opposite end of the lever to exert a force against an actuator button 126 on microswitch 42. When microswitch 42 closes, key compartment locking solenoids 36 energize, provided the appropriate authorization signals have been exchanged between the lock and key.

When key compartment locking solenoids 36 energize, their plungers 116, 118 retract. When the plungers retract, locking stem 104 is allowed to travel forwardly, no longer bound by the engagement of the plungers in the turned cut portion of the stem. Thus, when the user releases the door, it is allowed to spring open, pushed by the force of stem spring 112 and a compressed door gasket 192.

Forward travel of door stem 104 when in its unlocked condition is limited by the engagement of retaining pin 120 with a stopping portion 126 of case 100. However, by the time door stem 104 has moved forwardly this distance, door latch 102 has unhooked from stem 104 under the influence of door latch spring 128, which lifts latch 102 about a pivot point 130. Door 24 is thus free to open about door hinge 132, thereby allowing access to the house key or other materials stored in key compartment 20.

Key compartment locking solenoids 36 return to their deenergized, locking states 0.25 seconds after microswitch 42 is reopened. Plungers 116, 118 are then urged against a rear barrel portion 134 of stem 104 if the stem is then in its unlocked position.

When door 24 is closed, latch 102 engages with a hook portion of stem 104 as these components are pushed inwardly. The hook portion of latch 102 has a curved upper surface so that it lowers into its latched position automatically when it meets the case. The front entrance to the bore within which these coupled elements travel has a chamfered upper portion 135 to further facilitate lowering hook portion of latch 102 into its locked position. With the latch and stem so engaged, stem 104 is pushed further inwardly until the spring loaded plungers 116, 118 of the key compartment locking solenoids are able to engage into the turned cut portion 110 of the stem. At this point, the door is locked. The door is also rendered shock proof in thisstate by the positioning of the latched components within the constraining bore which prevents these components from becoming disengaged.

Reviewing the key compartment access operation, it will be noted that door 24 is positioned on the front of lockbox 12 and pivots downwardly to expose the lockbox contents. This arrangement facilitates operation of lockboxes mounted in awkward locations, such as on ground level water faucets, especially when compared to prior art systems in which the key container had to be released from the underside of the lockbox. Similarly, the present arrangement in which the key is coupled to the lockbox simply by bringing the key near the slot in the upper front portion of the lockbox provides a substantial improvement in operating flexibility over prior art systems in which the key had to be engaged with the lockbox in a precise position and then manipulated while in that position in order to operate the lockbox.

The use of a key compartment door 24 on the lockbox of the present invention also provides a variety of security enhancing features not found in prior art lockboxes. For example, the shackle release mechanism of the present invention is concealed behind the key compartment door, thereby protecting it from vandalism and providing an additional measure of security to the shackle. Similarly, battery compartment retaining bolt 180 and tamper proof screws holding lockbox circuit board 182 and the lockbox's rear cover in place are also protected from tampering by being positioned behind door 24.

Figure 4:
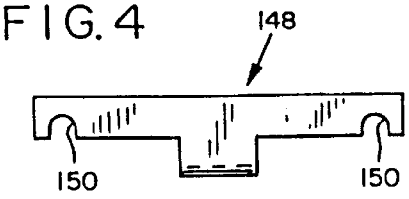
FIG. 4 is a top view of a shackle locking bar used in the lockbox of FIGS. 2 and 3.
Figure 5:
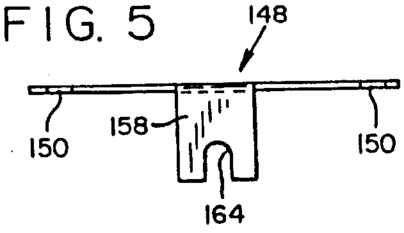
FIG. 5 is a rear elevational view of the shackle locking bar of FIG. 4.
Figure 7:
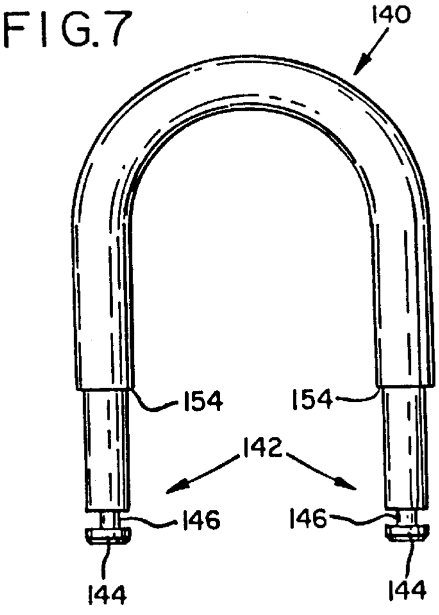
FIG. 7 is a front elevational view of a lockbox shackle used in the lockbox of FIGS. 2 and 3.

Turning now to release of the shackle, FIGS. 2 and 7 show that shackle 22 includes a loop portion 140 and two end portions 142. Each end portion includes a butt portion 144 and a turned cut portion 146. Shackle 22 is maintained in its locked position by a locking bar 148, shown in FIGS. 4 and 5. When in the locked position, turned cut portions 146 in both ends of shackle 22 are engaged by circular notches 150 in locking bar 148. Locking bar 148 is maintained in engagement with the turned cuts 146 of shackle 22 by the locking bar's own engagement on a shackle stem 162. Locking bar 148 is engaged on a butt portion 160 of the shackle stem by engagement between an elongated cut 164 in a flat portion 158 of the bar with a groove 166 in the butt portion of the stem. Shackle stem 162 is spring biased towards the front of the case by a spring 156 compressed between flat portion 158 of locking bar 148 and the rear of the case. However, stem 162, and consequently locking bar 148, are prevented from moving forwardly by the engagement of plungers 168, 170 of shackle locking solenoids 38 with a turned cut portion 172 in the stem.

Figure 8:
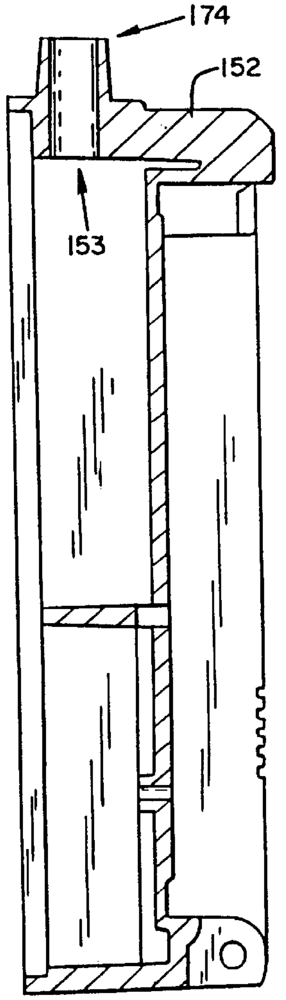
FIG. 8 is a sectional view of the case of the lockbox of FIGS. 2 and 3 taken along line 8—8 of FIG. 2.

It will be recognized that the above-described shackle locking arrangement prevents any external force, regardless of how it is applied, from imparting a load to shackle locking solenoids 38. For example, if it is attempted to pull locked shackle 22 out of case 100, locking bar 148 will lift slightly off shackle locking stem 162 and will immediately engage a casting 152 (shown also in FIG. 8) in the upper portion of the case. (Casting 152 fills the upper portion of the case and includes two openings 153 sized just to allow passage of the end portions 142 of the shackle). The force pulling shackle 22 from case 100 is thus applied entirely against casting 152 and does not include any component directed against solenoids 38.

Similarly, if it is attempted to push locked shackle 22 into case 100, a pair of shoulders 154 on the lower portion of shackle 22 are immediately forced into engagement with a pair of protrusions 174 (FIG. 8) formed on the top of case 100. (Shoulders 154 and protrusions 174 are obscured in FIGS. 2 and 3 by a plastic rain guard 175 formed around shackle 22). The force pushing shackle 22 into case 100 is thus applied entirely against the case 174 and again does not include any component directed against shackle locking solenoids 38.

Even if the ends of shackle 22 are twisted, as may occur if a shackle cable (discussed below) is used, locking solenoids 38 are still isolated from any load. Any twisting motion of the shackle ends simply causes the turned cut portions 146 of the shackle to turn harmlessly in the circular notches 150 of locking bar 148.

If release of the shackle has been authorized, lockbox CPU 28 first unlocks the key compartment door 24 to allow access to the shackle locking stem 162 normally concealed behind this door. Shackle locking solenoids 38 are energized for eight seconds beginning two seconds after door 24 is opened (as detected by microswitch 42). When plungers 168, 170 of energized shackle locking solenoids 38 attempt to retract, however, they are prevented from doing so by their frictional engagement with the edge of the turned cut portion 172 in shackle locking stem 162. This engagement is maintained by spring 156 which pushes the edge of the turned cut portion 172 of the stem against the sides of the solenoid plungers.

In order to release the shackle, the user must press shackle locking stem 162 rearwardly a short distance so as to free plungers 168, 170 from their frictional engagement with the edge of turned cut portion 172 of the stem. When stem 162 is pressed rearwardly in this manner, energized solenoids 38 immediately retract their plungers from the stem. When the plungers retract, stem 62 is allowed to travel forwardly, no longer bound by the plungers' engagement in the turned cut portion 172 of the stem. Thus, when the user releases the stem, the stem is allowed to spring forwardly, pushed by the force of compressed spring 156.

When shackle stem 162 moves forwardly under the force of compressed spring 156, it causes the shackle locking bar 148, linked to the stem at butt portion 160, to also move forwardly. This forward movement of shackle locking bar 148 disengages the circular notches in the locking bar from the turned cut portions 146 in the shackle. (Forward travel of stem 162 and locking bar 148 is limited by the locking bar's engagement with a stop member 159 formed in case 100). In this unlocked state, the shackle can then be freely withdrawn from the lockbox.

If shackle locking stem 162 is not pushed inwardly within eight seconds, locking solenoids 38 are deenergized, thereby relocking the stem, and consequently the shackle, in place.

(It will be noted that the above described press-to-release mechanisms provided on both the key compartment door and on the shackle locking stem serve to remove all loads from the solenoids plungers when these plungers are being retracted to their unlocked states. Consequently, the solenoids employed in the present invention can be relatively small, thereby reducing both power drain and system cost.)

When it is desired to relock the shackle, the shackle is reinserted in openings 153 in the top of case 100 and pressed downwardly until shoulders 154 on the shackle engage the upper protrusions 174. The shackle stem 162, which is protruding forwardly under the influence of spring 156, is pressed inwardly by the user, thereby causing circular notches 150 in locking bar 158 to move back into engagement with turned cuts 146 in the shackle. Stem 162 can be pressed inwardly simply by closing key compartment door 24. After the shackle stem has been pressed in a distance, plungers 168, 170 of shackle locking solenoids 38 spring from their unlocked positions (pressing against the barrel portion 176 of stem 162) back into the turned cut portion 172 of the stem. This action relocks the shackle stem in its locked position and correspondingly locks shackle locking bar 148 in its locking relationship with shackle 22.

In addition to the lockbox security features already described, door locking stem 104 and shackle locking stem 162 also serve security functions by rendering the inner workings of the lockbox inaccessible to vandalizing users. Once door 24 is opened, as for example by an authorized user, the two bores in which these stems travel could provide passageways to the inner workings of the lockbox. A vandalizing user who is so inclined might attempt to tamper with the internal mechanisms through these passageways. In the present invention, however, such tampering is thwarted by stems 104 and 162 which occlude these passageways so as to block all access to the inner workings of the lockbox.

Reviewing other mechanical components of the lockbox briefly, primary lockbox battery 32 comprises five alkaline AA cells-mounted next to one another in a battery pack 178 mounted in the lower rear of the unit and held in place by a bolt 180. An O-ring seal is provided around battery pack 178 and around the lockbox rear cover to prevent rain and contaminants from entering the case. The backup battery 34 is mounted on a circuit board 182 in the back of the unit, which circuit board also supports the lockbox CPU 28, RAM 30 and related circuitry.

Communications coil 26 is mounted in the upper front of the lockbox, adjacent a receiving nest 184 into which the top end of key 14 is inserted. Coupling between communications coil 26 and key 14 through the metal lockbox case 100 is facilitated by a small slot 186 that extends through case 100 for the length of coil 186. This slot is filled with an insulating resin material that also pots the communications coil in place.

Inside key compartment door 24 is a stainless steel liner 188 with a lip portion 190 that reinforces the door and helps retain the contents near the door as the door is being closed. Cellular urethane gaskets 192 are positioned at the points where door 24 contacts the case so as to prevent rain and contaminants from entering the case. This cellular urethane material resists taking a set, thereby assuring a long life for the door seals. An injection molded plastic bumper (not shown) can be provided on the outside of the lockbox so as to protect the fixture to which the lockbox is mounted (i.e. a door) from abrasion.

In alternative forms of the invention, shackle 22 can comprise a vinyl clad steel cable terminated with appropriately machined ends, such as ends 142 on shackle 22, so as to permit connection of the lockbox to trees and the like. The cable can again be provided with drip caps to prevent rain from entering the lockbox.

Having illustrated and described the principles of our invention with reference to a preferred embodiment and several variations thereof, it should be apparent to those skilled in the art that the invention can be modified in arrangement and detail without departing from such principles. For example, although the system is described with reference to a lockbox system for containing dwelling keys, it is readily adaptable to other uses, such as in industrial security systems. Similarly, although the preferred embodiment has been described as including all the claimed features, other systems could readily be designed that include only some of these features and that include other features not here discussed. Accordingly, we claim as our invention all such modifications as may come within the spirit and scope of the following claims and equivalents thereof.

Level One System

Figure 22:
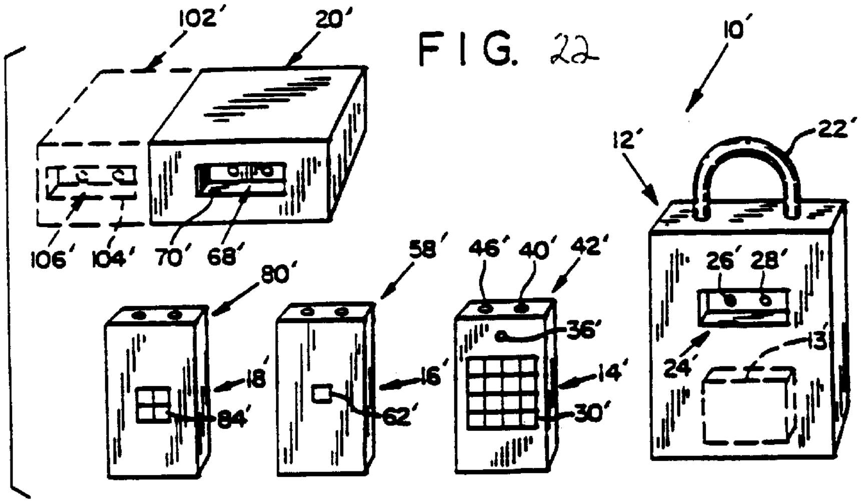
FIG. 22 is a diagram of Level One system, with a component from a Level Two system shown in dashed lines.

The Level One, or basic, system 10', shown in FIG. 22, includes one or more lockboxes 12', agent keys 14', reader keys 16', programmer keys 18' and data communicator units 20'. (A "pod" 102' used in the Level Two system is shown in dashed lines.) Lockbox 12' contains the door key to the listed dwelling and is mounted securely on or near the dwelling. Agent key 14' is used by real estate agents to open the lockbox and gain access to the key contained therein. Reader key 16' and programmer key 18' are used to read data from, and load instructions into lockbox 12', respectively. Data communicator unit 20' is used to recover the data read by reader key 16' and to load instructions into programmer key 18'. These elements are described in more detail below.

Lockbox 12' includes a secure enclosure 13' designed to hold house keys, business cards, written messages and the like. The lock box is securely attached to the listed house or other fixed object by a shackle 22' or by screws (not shown). Shackle 22' in most instances attaches the lockbox to a door knob, water spigot or porch guardrail. Upon a proper exchange of signals between lockbox 12' and an agent key 14', as described below, the lockbox compartment opens, allowing access to the house key and other materials stored inside.

In the preferred embodiment, the exchange of signals comprises a three-way handshake. First, the agent key 14' sends a first control signal (a) to lockbox 12' which includes a key identifier code identifying the agent, the agency, the real estate board and the agent key serial number. If the lockbox recognizes the first control signal as being properly authorized, it then responds by sending a second control signal (b) back to the agent key identifying the lockbox. Upon receiving the second signal from the lockbox, the agent key determines whether the lockbox is one to which it is authorized access. If such a determination is favorable, the key sends a third, unlocking signal (c) back to the lockbox. The lockbox storage compartment 13' then opens.

All communications with lockbox 12' are effected optoelectronically. Lockbox 12' is equipped with an optoelectronic communications port 24' which includes a transmitting light emitting diode (LED) 26' and a receiving photodetector 28'. All keys and other units which communicate with lockbox 12' have a corresponding optoelectronic communications port comprising a reciprocal photodetector and LED pair.

Figure 23:
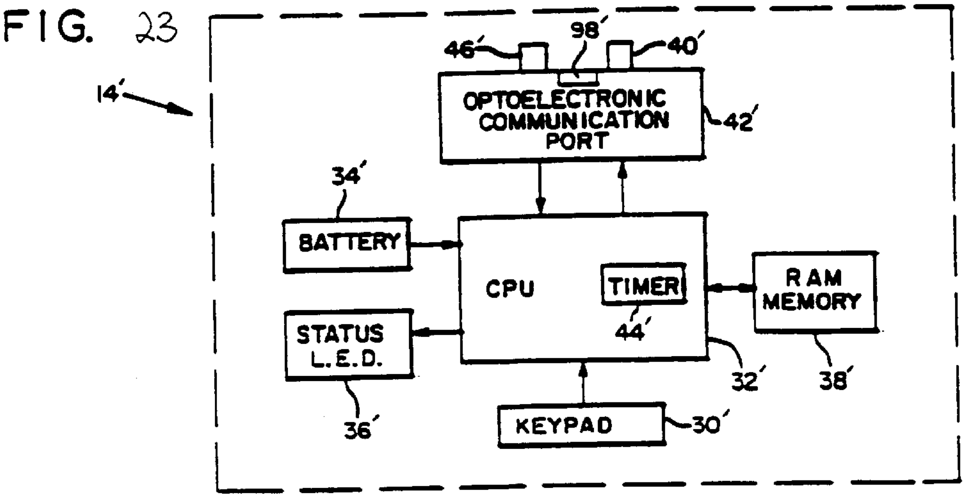
FIG. 23 is a schematic block diagram of an agent key used in the system of FIG. 22.

The agent key 14' has length and width dimensions comparable to a credit card, and a thickness of approximately a quarter inch. The circuitry of agent key 14' is shown in FIG. 23 in block diagram form. A 16-key keypad or other switch mechanism 30' is connected to a central processing unit (CPU) 32', which is powered by a battery 34'. The user energizes the key by pushing an "ON" button on keypad 30'. A "STATUS" L.E.D. 36' then begins to flash, indicating that agent-key 14' is energized. (Alternatively, an audible tone generator, not shown, can be substituted for the L.E.D. 36'.) The user then has ten seconds within which to enter a four digit password on keypad 30'. If no password code is entered, a timer 44' in agent key 14' causes the key to become deenergized again. If the four digit sequence matches the sequence stored in an agent key RAM memory 30', the key becomes "armed." After the key is "armed," the user can press an "OPEN" button on keypad 30' which causes CPU 32' to send the above-described first control signal (a) to lockbox 12' using a transmitting L.E.D. on its optoelectronic communications port 42'. Agent key optoelectronic communications port 42' also includes a receiving photodetector 46').

If an improper four digit password is entered on touch pad 30', agent key 14' will not arm and will not send a signal to lockbox 12'. The user can then start over and enter the proper password. If, after five tries, the proper password is still not entered by the user, the CPU 32' is configured so that agent key 14' will deactivate itself for a ten minute period and will not allow any further codes to be entered.

Agent key 14' is initially activated by a programming routine that is run on data communicator 20'. This routine loads a variety of information, and enables a number of functions, into the agent key. The information loaded includes the agent, agency, board, password, and key expiration date (discussed below). Functions enabled may include shackle release (discussed below). After its initial activation, the agent key will not require further programming, except for periodic rejuvenation (also discussed below).

Figure 24:
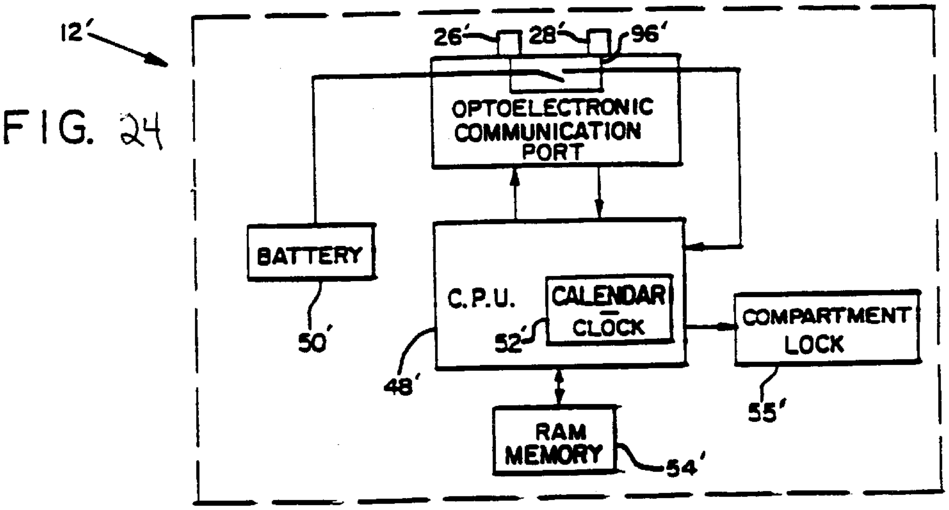
FIG. 24 is a schematic block diagram of a lockbox used in the system of FIG. 22.

FIG. 24 is a block diagram showing circuitry of lockbox 12'. Photodetector 28' of lockbox optoelectronic communications port 24' receives the first control signal (a) from the transmitting LED 40' of the agent key 14'. It then decodes this signal and feeds it to a lockbox CPU 48'. (CPU 48' and other lockbox circuitry is powered by an internal battery 50'.) If the CPU recognizes the first control signal as corresponding to an authorized key, lockbox 12' returns the second control signal (b) to agent key 14' using transmitting LED 26' of optoelectronic communications port 24'. If CPU 48' does not recognize the key identifier code sent from agent key 14' in first signal (a), or determines that the key identifier code is otherwise invalid, lockbox 12' will not respond with the second signal (b).

The second signal (b) sent by lockbox 12' to agent key 14' includes an assignment code identifying the board, agency and agent which listed the house. When agent key 14' receives this y assignment code, its internal CPU 32' scans a list of authorized codes stored in its internal RAM memory 38' and compares the authorized boards in this list with the received assignment code. If the board recited in the lockbox assignment code is one of those stored in agent key memory 38', the key transmits the third signal (c) to lockbox 12'. This third signal (c) is received and decoded by optoelectronic communications port 24' and CPU 30' of lockbox 12'. An output from CPU 48' to a lockbox compartment lock 55' then causes the compartment to open.

Lockbox CPU 48' maintains a lockbox access log in a lockbox RAM memory 54' which logs all accesses. Each entry in the log includes the key's identifier code, the time and date of the attempted access (obtained from an internal calendar-clock circuit 52'), and the access result. The access result entry can, for example indicate: access allowed, key on lockout list, daily timed disable lockout, or unarmed key (lockout list and daily timed disable are discussed below). The lockbox RAM memory can log such information on 100 lockbox accesses.

This log can later be retrieved by the reader key 16'. Such operation transfers a copy of the access log to the reader key for later display by the data communicator unit 20'.

Figure 25:
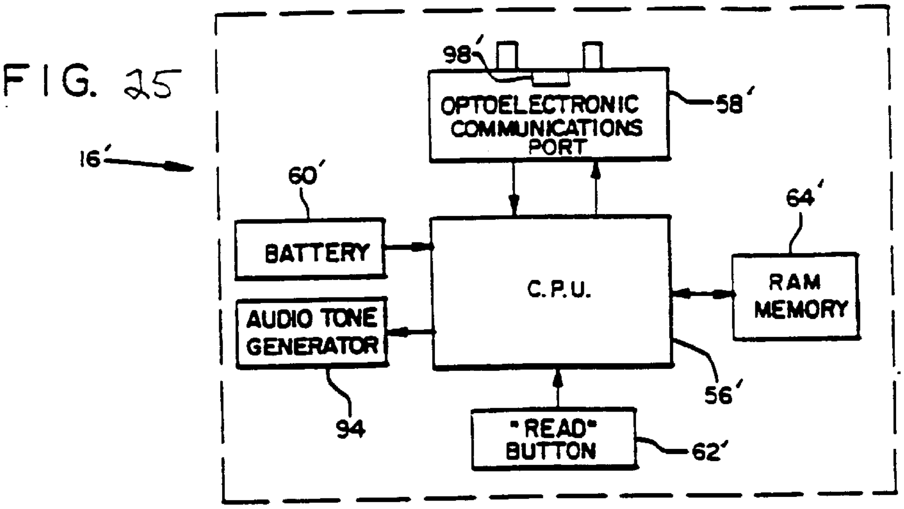
FIG. 25 is a schematic block diagram of a reader key used in the system of FIG. 22.

The reader key 16', shown in FIG. 25, is similar in many respects to agent key 14'. It includes a CPU 56', an opto-electric communications port 58', a battery 60', a "READ" button 62' and a large RAM memory 64'. The access log stored in lockbox RAM 64' can be transferred to the reader key RAM 64' simply by pressing the "READ" button and optically coupling the reader key and the lockbox. If optical coupling is not achieved within a present time period, the key returns to its inactive state. The reader key RAM 64' is large enough to store the access logs of ten different lock-boxes.

Like the agent key 14', the reader key 16' is initially activated by a programming routine that is run on data communicator unit 20'. This routine loads a variety of information into the reader key, such as the identity of the operating agency and the length of the preset delay period. Thereafter, no further programming is required. (Memory pointers to read key RAM 64' are reset each time the contents of the RAM are transferred to the data communicator unit.)

The data communicator unit 20' includes a single board computer (SBC) 66' having an optoelectronic port 68' identical to that included in lockbox 12'. This port is constructed as part of a nest 70' designed to receive any of the three keys (agent key 14', reader key 16' and programmer key 18'). When a key is inserted in the nest, it becomes optoelectronically coupled to the single board computer 66' inside the data communicator unit. The single board computer can retrieve access log data from the keys or load new operating parameters into them (discussed below). In this manner, keys can be loaded with, and dumped of data as appropriate.

Data communicator unit 20' is typically installed, in the Level One system, at the real estate board offices and is connected to a CRT monitor 72', a printer 74' and a keyboard 76'. When a reader key 16' is inserted into the data communicator unit nest 70', the access log data stored in the key can be retrieved and displayed on monitor 721 or printed by printer 741. In this manner, a record showing which agents visited the homes at what times can be provided.

Figure 26:
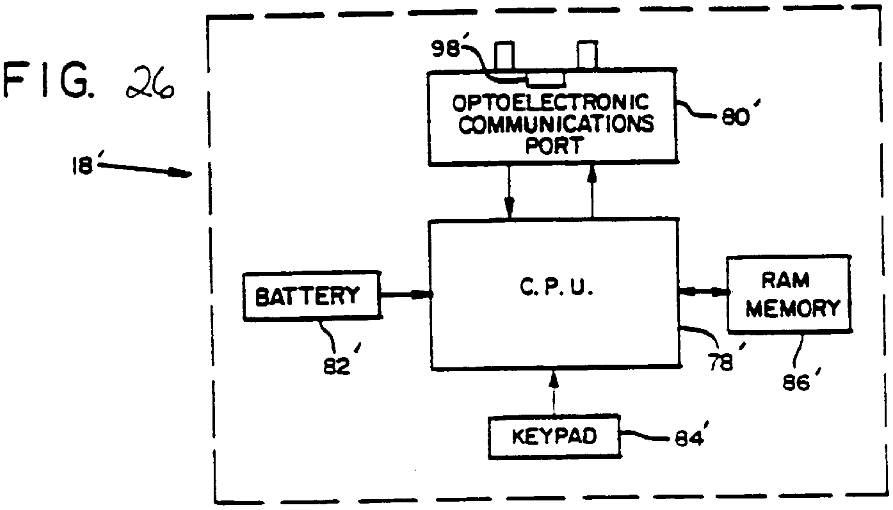
FIG. 26 is a schematic block diagram of a programmer key used in the system of FIG. 22.
Figure 27:
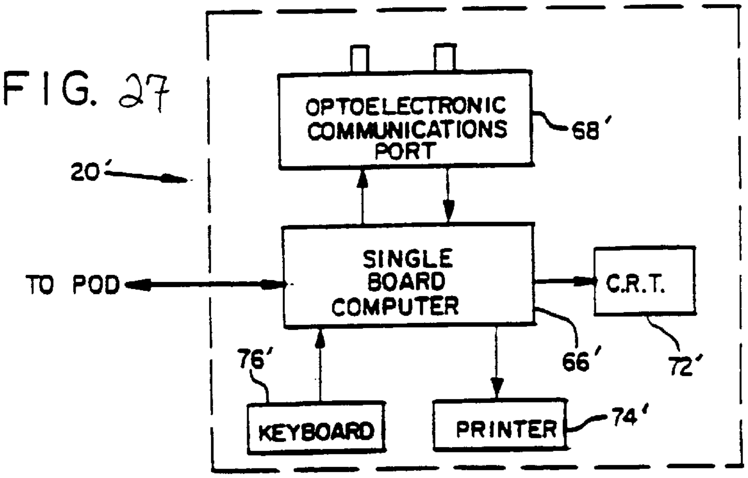
FIG. 27 is a schematic block diagram of a data communicator unit used in the system of FIG. 22.
Figure 28:
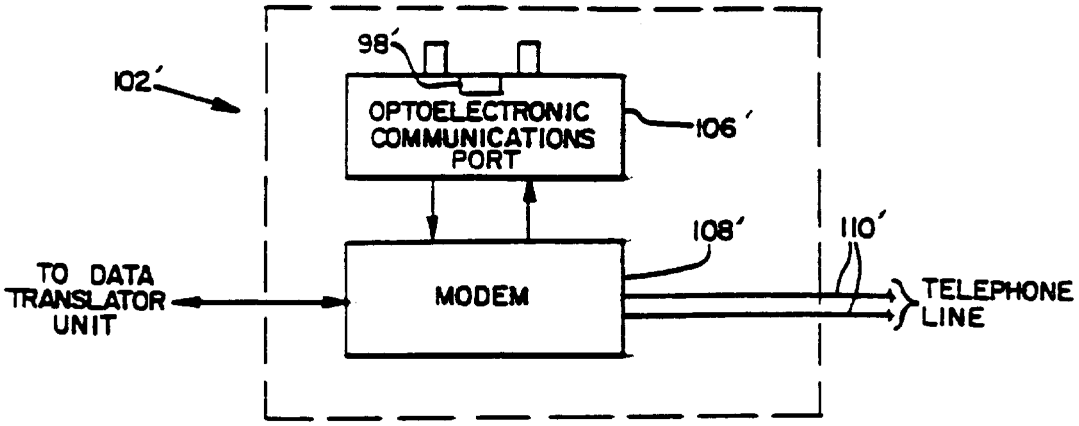
FIG. 28 is a schematic block diagram of a pod used in an enhanced version of the system of FIG. 22.

Data communicator unit 20' can also be used, in conjunction with the programmer key 18', to reprogram lockboxes 12'. Programmer key 18', shown in FIG. 26, is again similar to agent key 14'. It includes a CPU 78', an optoelectronic communications port 80', a battery 82', a small keypad 84' and a RAM memory 86'. The programmer key RAM memory 86' is loaded by the data communicator unit 20' with information destined for the lockbox 12'. The information loaded into programmer key 18' includes the listing agent and the listing agency, and serves to enable various lockbox features, such as daily timed disable and lockout list (these features are discussed below). When programmer key 18' and lockbox 12' are subsequently optically coupled, this information can be transferred from the programmer key RAM 86' to the lockbox RAM 54' by pressing a "PROGRAM" button on programmer key keypad 84'.

In more detail, reprogramming of the lockbox is effected as follows. The programmer key 18' is first inserted into the data communicator unit nest 70'. A lockbox programming routine, sorted in a data communicator memory 88', is then run on the data communicator single board computer 66'. This routine allows various parameters and features of the lockbox (as discussed above) to be changed. The reprogramming routine presents menus on the CRT monitor 72' to facilitate such programming. When suitable lockbox program parameters have been established, the data communicator unit single board computer 66' loads them into the memory 86' of the programmer key 18'. The programmer key can then be taken from the data communicator unit nest 70' to the lockbox and can transfer the new operating parameters to it through the two units' optoelectronic communications ports. All "programming" of lockbox 12' referenced below is effected, in the Level One system, by this technique.

The following discussion details some of the functions of the preferred embodiment of the Level One system:

Daily Lockbox Disable

Oftentimes, homes listed by real estate agents are not vacant. The current owners are still residing in the house and may not welcome visitors at certain hours. For example, a homeowner may wish that this house not be shown between the hours of 7 p.m. and 10 a.m. Accordingly, CPU 48' of lockbox 12' can run a software routine, stored in lockbox memory 54', that disables the lockbox from opening during certain predetermined hours of the day. The daily lockbox disable software routine operates in conjunction with the real time clock 52' internal to the lockbox. This function is enabled by selecting the Daily Time Disable option which appears on the CRT 72' during programming of the programmer key 18' by data communicator unit 20'. If this option is selected, the data communicator unit 20' then asks the times during which the lockbox is to be disabled. This data is loaded into the programmer key 18', which in turn loads it into the lockbox memory 54', as discussed above.

Key Expiration

To enhance security of the system, some or all of the agent keys 15' can be programmed to expire (become disabled) after a certain number of days or weeks. By this technique, keys that are lost or stolen lose their utility in a relatively short time. The key expiration feature can be implemented using a real time clock 90' internal to agent key 14', or can be based simply on a long term timer (not shown). If this feature is adopted, the supervising authority (typically the real estate board) can then specify how long the key is to remain active before automatically disabling itself.

After a key has expired, it must be rejuvenated (in the Level One system) by a data communicator unit 20' before it can be used again.

Lockbox Disable

At times, it may be advantageous to render the contents of the lockbox 12' inaccessible to everyone at all times. This is another lockbox operation option that can be selected when lockbox functions are loaded into the programmer key 18' by a data communicator unit 20'.

Key Disable

The agent key 14' can be deactivated, upon command, to disable its further use. For example, when an agent leaves his employment, he may wish to disable his key so that no one can take it from storage and use it. After being deactivated by the agent, the key must be reinitialized by a data communicator 20' before it can be used again.

Electronic Shackle Release

The release 22' or mounting bracket which secures the lockbox to the structure is, in the preferred embodiment, electronically releasable. Certain agent keys 14' can exercise this capability by pressing a "SHACKLE" button on the agent key keypad 30'. However, not all agent keys are able to release all lockbox shackles. In order for an agent key to release a shackle, the key must have certain authorization bits set in its RAM memory 38'. Depending on which bits are set, the key will be able to release shackles of lockboxes assigned to that agent, to that agent's agency, or to that agent's board. (The agent key determines the lockbox assignment from the contents of the second signal (b), which identifies the parties that are authorized to unlock the lockbox.) By allowing real estate agents, rather than just real estate board employees to remove lockboxes, administration of the system is greatly facilitated.

Lockbox Disable Upon Removal

After a real estate agent has released a lockbox shackle, the lockbox could normally be reinstalled on another house. Before such installation, however, the lockbox must be reprogrammed with a variety of information, such as the listing agent, the listing agency, the listing number, the daily time disable periods, etcetera. This reprogramming is normally accomplished by loading a programmer key 18' with the new data and loading the lockbox from the programmer key, as discussed above.

In large systems (discussed below), the above "on the fly" reprogramming procedure is undesirable. It does not guarantee that the data loaded into the programmer key 18' is actually transferred into the lockbox. In systems where data integrity is important, it is desirable that the lockbox be programmed directly by the system (by a "pod," as discussed in the Level Two system, below) without the use of an intermediate programmer key. To insure that "on the fly" reprogramming of lockboxes is not done, a Lockbox Disable Upon Removal feature is selectably provided.

When the Lockbox Disable Upon Removal feature is used, the lockbox becomes disabled when the shackle is released. In this disabled state it cannot be reprogrammed by the programmer key; it must be returned to the board (or agency) office for reprogramming. By requiring the lockbox be returned for reprogramming, the board is more reliably informed of the program status of each lockbox, and the integrity of the board's lockbox database is maintained.

Data Communicator Unit Protection

The software resident in the data communicator unit 20' contains sensitive information and coding which, if widely known, could pose a threat to the security of the listed houses. Accordingly, it is important that this software not be available to unauthorized users.

Normally, once a software pirate has gained access to a ROM chip containing CPU software, it is a simple matter to copy the chip and dump its contents in a computer listing. The code can then be disassembled and examined to discover the proprietary information.

To avoid this potential problem, the software in the data communicator unit of the present invention is stored in a volatile RAM memory 88'. As long as power is provided constantly to this memory, its contents will remain intact. If, however, power is momentarily lost, all software stored in the RAM will be lost as well. Interrupt switches 92' are provided inside the data communicator enclosure to interrupt power to this RAM if the enclosure is opened. In this manner, security of the software stored in the RAM is provided. (The data communicator is normally powered by conventional alternating current, but has a built-in battery back up to protect against loss of software in the event power fails.)

If someone tampers with the data communicator unit, causing the RAM 88' to lose all software, the data communicator must be reprogrammed by the vendor. This can be done either by sending the unit back to the vendor or by reprogramming over telephone lines, as discussed more fully below. In either event, the vendor would reprogram the unit only after the issue of the data communicator's physical security had been investigated and resolved.

Communicator Security While in Shipment

As noted, the data communicator unit 20' contains sensitive information that might be used to breach system security if used by unauthorized persons. The RAM based software, described above, is one technique for preventing improper use of the data communicator software. Another concern, however, is that a data communicator unit might be intercepted from the mail while being shipped from the vendor to the end user. Even without opening the enclosure to pirate the RAM software, the mere possession of the unit by unauthorized persons poses some security risk.

To overcome this problem, the data communicator units are shipped in a disabled mode. For example, they can be shipped with software that will not operate until it receives certain enabling code sequences. The vendor could call the recipient and give these codes orally after the data communicator's safe arrival had been confirmed. The user could then enter these enabling codes into the data communicator unit with the keyboard 76'. Alternatively, if a phone line is coupled to the data communicator unit (as described below), the enabling codes, or the entire data communicator software can be transmitted from the vendor directly to the data communicator unit. In either case, the data communicator would be useless to those who obtained mere possession of the unit.

Agent/Reader Keys

Normally the agent who uses an agent key will not need the capability of retrieving data from a lockbox. However, to minimize costs of administering the system, it is sometimes desirable that agents be able to retrieve such data and return it to the agency or board office. In such case, the agent key can be equipped with the functions of a reader key, together with a correspondingly large memory, to facilitate transfer of access logs from lockboxes to the agency or board office.

Acoustically Coupled Key

Normally, the access log data retrieved from lockbox 12' by reader key 16' is transferred to the system (i.e. the data communicator unit 20') optoelectronically. In certain instances, described more fully below, it may be desirable to download data from the reader key over telephone lines. For this function, reader key 16' is equipped with an audible tone generator 94' which can be selectively enabled by the user. When so enabled, it can transmit data in an acoustical, rather than an optical format. The key can be held up to the mouthpiece of a telephone to effect the acoustical coupling to the phone line. By this technique, data can be downloaded from a reader key to a data communicator unit coupled to a phone line (discussed below) without the necessity of physically returning the key to the data communicator unit.

Mark File

As noted, the access log maintained in the memory 54' of the lockbox 12' contains data relating to the last 100 accesses. Transfer of this data to a reader key or to an agent/reader key is accomplished quickly, due to the use of optical communications. If, however, the reader key uses its acoustical coupling capability to transfer this data to the system, the resulting data transfer takes a comparatively long time, during which the reader key and telephone handset must be maintained in acoustical communication. Maintaining acoustical communication between these units is not difficult, but can be made even more simple if the data transmission is shortened. Oftentimes, not all 100 past accesses are of interest. For example, the supervising real estate board or agency may only be interested in accesses over a certain period of time. To facilitate this function, the lockbox memory 54' can be marked with one or more flags. This memory can then be read from the last flag to the end, or just between two flagged positions. By this technique, only the data of interest is transferred.

As noted, the mark file function is useful when a real estate agency or board is interested in monitoring the access to a home during a specific period, as for example during a weekend that the house is advertised in the newspaper. In such case the lockbox can be commanded, with a programmer key, to flag the next memory location as the beginning of the flagged list. This would be done on Friday evening. An agent would then return Monday morning and recover just the entries in the access log made since the flagged time. Alternatively, the agent could insert a second flag in lockbox memory 54' without retrieving the data, thereby allowing the flagged entries from this period to be recovered later. If a lockbox is moved from one house to another, a flag can mark the move so that the move is indicated on the access log. Data can then be selectively recovered from the lockbox so that only accesses at the new location are recovered.

Another option, the reader key or agent/reader key can be operated to retrieve only the last N entries stored in the lockbox access log (where N is selected by the user). This may be useful, for example, to determine who recently opened the lockbox.

Reed Switch

The photodetector 28' in the optoelectronic port 24' of the lockbox 12' generates a signal whenever it is exposed to light. Such a signal can be used to switch a lockbox from an idle to an active state. Such photodetectors, however, are also sensitive to ambient light, such as sunlight and porch lights. To prevent the undesired activation of the lockbox, and consequent increased drain on its internal battery 50', a reed switch 96' is provided in the power circuitry of the lockbox. This reed switch is normally open, thereby leaving all of the lockbox circuitry, except the internal clock 52' and memory refresh circuitry, in an unpowered state. A magnet 98' is mounted in the optoelectronic communication port of each key and causes the lockbox reed switch 96' to close when the key is brought in close proximity thereto. In this manner, the lockbox is maintained in a substantially idle state until a key is held in proper position. Power is then applied to all lockbox circuits and the lockbox becomes active. This reed switch feature also increases security by rendering the lockbox unresponsive to attempted accesses by makeshift keys.

Preload Permission Code

As noted, the agent key 14' must be held next to the lockbox 12' in order for the units to communicate optoelectronically. Although not usually a problem, this task is sometimes difficult when the lockbox is mounted in an awkward location, such as on a water spigot mounted at ground level. Ordinarily, the agent would have to engage the key with the lockbox in such position and then start pressing buttons on the agent key corresponding to the required password and auxiliary permission codes (discussed below. This task is even more tedious at night.

To obviate this potential problem, the agent key 14' of the present invention can be preloaded with all of the password and permission codes needed to access the lockbox. The key can then be mated momentarily with the lockbox and the handshaking exchanges made automatically upon closure of the lockbox reed switch 96'. Thus, the agent need not press a single key in the dark or cramped location in which the key and lockbox are mated in order to open the lockbox. The password and auxiliary permission codes can be preloaded in a well-lit, convenient location, such as in a car. The agent then has two minutes within which to use the preloaded agent key to open the lockbox. After this period the preloaded information is lost, thereby aiding in system security. This feature greatly facilitates opening lockboxes mounted in awkward or poorly lit locations.

Audit Trail

Occasionally, a vendor will receive reports that a lockbox or key is inoperative. To aid in investigations of such reports, the lockbox and keys of the present invention include a section of their RAM memories dedicated to storing detailed information on the last ten attempted operations. This information identifies the type of operation attempted, whether it was successful, and any error messages generated by an unsuccessful operation.

The audit trail of an exemplary agent key operation might be as follows. The key is energized by the "ON" button. The four digit password is then entered, followed by a keystroke (or keystrokes) identifying the desired operation (such as release shackle or open lockbox). If an incorrect password is entered, an unsuccessful attempt to arm the key would be stored in the agent key audit trail, with an error message indicating use of an incorrect password. If an operation is attempted but is unauthorized (i.e. unauthorized shackle release), a corresponding entry would be made in the agent key audit trail.

The audit trail of an exemplary lockbox operation might be as follows. The lockbox is activated by closure of the reed switch, but the key is improperly inserted so that optical communication cannot be established. An unsuccessful attempt to communicate with the lockbox would then be logged in both the lockbox and agent key audit trail.

Upon reports of a malfunctioning lockbox or key, the corresponding audit trail can be retrieved, either by sending the unit to the vendor or by coupling it to the vendor through a modem (described herein) to facilitate resolution of the anomaly.

Lock Out List

In certain instances, it may be desirable to lock out certain agents, or agents from certain agencies, and thereby deny them access to a listed property. In the preferred embodiment, RAM 54' of lockbox 12' contains a list of key identifier codes that, although nominally valid, are to be locked out. The identifier code of the accessing agent key is compared against this list by lockbox CPU 48'. If the accessing key's identifier code is found in this list, lockbox 12' will abort the handshaking exchange and deny access to the key compartment.

As a further option, the lockbox CPU 48' can be programmed to disable any lockedout keys that attempt to access the lockbox. In this case, lockbox CPU responds to the first signal sent by the agent key with a special second signal that scrambled the RAM memory 38' of the agent key so that the key is rendered inoperative. In the preferred embodiment, the lockbox scrambles the four digit password that must be entered by the user to "arm" the agent key, by replacing certain digits of the password with hexadecimal digits (A–F) which are not included on the agent key keypad 30'. With the password thus scrambled, the user can no longer "arm" the key and initiate a handshaking exchange with any lockbox. The password can only be unscrambled by reprogramming the agent key, which operation is usually only performed by the supervising real estate board.

Exclusive Listings

At times, an agency may wish to list a property exclusively, denying access to agents from other agencies. In this case, the lockbox is programmed to open only for agents from the listing agency, and to deny access to all others.

Multi-Board Capability

It is sometimes desirable to make a listed house available to agents from a plurality of different real estate boards. Normally, keys owned by one real estate board will not be able to open lockboxes owned by another real estate board (the second signal (b) sent from the lockbox to the key will not correspond to a lockbox that the key is authorized to unlock). In the present invention, a section of lockbox memory 54' is used to store identification codes identifying up to fifteen real estate boards which are authorized to access the lockbox. All fifteen of these board identification codes are sent with the second signal (b). If the key is authorized to open lockboxes from any one of these boards, the key will respond with the third, unlocking signal (c). By this technique, properties in large metropolitan areas, served by several real estate boards, can be accessed by agents from all cooperating boards.

Auxiliary Permission Code

In normal operation, the lockbox 12' must receive a proper key identifier code from the agent key 14' (signal "a") during the handshaking exchange before the lockbox will open. Optionally, the lockbox can be programmed to require that an additional four digit permission code be received before the lockbox opens. This auxiliary permission code is entered onto the keypad 30' of the agent key by the agent when opening the lockbox. This code is then passed to the lockbox as part of the key identifier signal (signal "a"). If this auxiliary permission code matches a corresponding auxiliary permission code stored in the lockbox, the lockbox will continue with the handshaking exchange. Otherwise, it will abort the attempted entry. This auxiliary permission code thus limits access to the house to those agents who know the four digit auxiliary permission code.

Typically, this feature is used to allow a real estate agent to personally limit the agents who have access to the listed house. This is another option that can be selected (typically by the board) when the lockbox is programmed. Thereafter, any agent who wishes to show the house must first call the listing agent to obtain the auxiliary permission code.

In the preferred embodiment, the lockbox CPU 48' automatically changes this auxiliary permission code every day, week or other period, as directed during programming of the lockbox, by using an encrypted algorithm. This algorithm is reseeded each time it is executed. A similarly programmed computer 100' at the agency or board office can compute the current auxiliary permission code by this same algorithm. Only the listing agent, however, is allowed to retrieve this number from the board computer. In this manner, the listing agent can carefully monitor and screen the agents who are allowed to show the listed house.

A lockbox that is programmed to require entry of this auxiliary permission code is also programmed to recognize the listing agent's normal key identifier signal (signal "a"). If it recognizes the agent seeking access as being the listing agent, the lockbox will not require entry of the auxiliary permission code.

LEVEL TWO SYSTEM

The Level Two system represents a small increase in cost and complexity over the Level One system, but enable a large number of additional features. The Level Two system includes all of the components used in the Level One system and further adds a "pod" 102'. Pod 102' is an accessory to the data communicator unit 20' and is designed to be electronically and physically coupled thereto. The pod includes a nest 104' and an optoelectronic communications port 106', similar to those included in the data communicator unit 20', but designed to receive lockboxes instead of keys. As a further feature, the pod includes a built-in modem 108' to enable both the pod and the coupled data communicator unit to send and receive data over a telephone line 110'.

The pod's most immediate function is to program lockboxes 12' directly. No longer must an agency use the intermediate step of programming a programmer key 18' to program a lockbox. Instead, the lockbox can be inserted into the pod nest 104' and programmed directly by the coupled data communicator 20'.

The built-in modem 108' also greatly increases the utility of the present invention. For example, it allows software to be loaded and certain command sequences to be sent directly from the vendor to the data communicator/pod assembly. By this technique, software in these units can be updated periodically as new features are added to the system.

LEVEL THREE SYSTEM

The Level Three system includes the components found in the Level Two system, but substitutes a personal computer, such as an IBM (not shown), for the monitor 72' and keyboard 76'. The addition of a PC substantially increases the system's capabilities. For example, access log data can be archived from the reader keys 16' onto a disk storage, instead of merely printed on a paper printout. The data can then be organized and manipulated by any popular PC database program.

In addition to the improved hardware capabilities, the Level Three system also offers an opportunity to use enhanced software routines. The single board computer 66' in data communicator 20' typically comprises a simple microprocessor with a limited instruction set. By adding a PC to the system, an enhanced version of the system software can be used, thereby leaving the data communicator single board computer to act as a smart input/output port. A software switch can be employed to determine whether the communicator processor or the PC is to operate the system. As a further benefit, special function keys on the personal computer can be preprogrammed to facilitate certain operations, so that long command sequences need not be entered.

LEVEL FOUR SYSTEM

The Level Four system is a comprehensive, integrated system designed to fulfill all lockbox management needs of a large real estate board.

Figure 29:
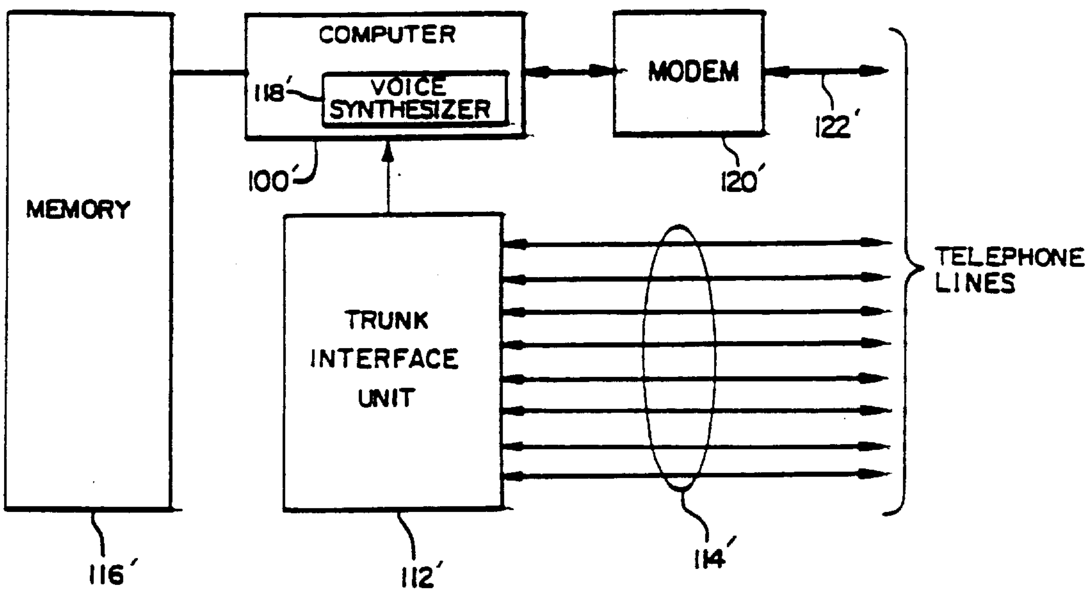
FIG. 29 is a diagram of a computer and trunk interface unit used in another enhanced version of the system of FIG. 22.

Some real estate boards have tens of thousands of lockboxes and keys in their systems, so an integrated management system is virtually essential. The Level Four system uses a computer 100' (shown in FIG. 29), resident at the board office, which interfaces with a plurality of Level Two and Level Three systems, resident at selected remote real estate agencies. The computer is desirably a multiuser, multitasking system with large amounts of online storage. A super microcomputer such as the NCR Tower system is a suitable machine.

Connected to super microcomputer 100' is a trunk interface unit 112', which allows a plurality of telephone lines 114' to interface with the super microcomputer simultaneously. In the preferred embodiment, eight telephone lines are used. The trunk interface unit allows the computer 100' to be interrogated over telephone lines and allows data to be exchanged with remote data communicator/pod assemblies. In such capacity, the data communicator/pod assemblies can function as remote input/output ports for the board computer and the data communicator's single board computer 66' can function as a smart input/output controller.

The trunk interface unit 112' also allows reader keys to download lockbox access logs directly into the board computer 100' over a telephone (without transporting the key to a pod-equipped agency) by using the audio tone generator 94', as noted above.

In the typical Level Four system, the communicator/pod assemblies installed at remote agencies are limited to performing certain preselected functions. For example, an agency communicator/pod assembly is typically enabled to update certain lockbox parameters (i.e. change agents listed on the lock-out list time periods for the daily disable, etc.), but cannot initialize the lockbox (i.e. select the real estate boards to which the lockbox will be accessible or disable the Lockbox Disable Upon Removal feature). Similarly, the agency communicator/pod assembly is typically enabled to deactivate agent keys, but cannot rejuvenate them. Such restricted functions can only be performed by the board computer 100'.

Super microcomputer 100' is used to keep track of all data pertinent to the system. Whenever a key or lockbox is read or programmed, the corresponding data is entered into a system database. This database, located in computer memory 116', includes information on all of the features and parameters heretofore mentioned, for each lock and key in the system Computer 100' can search the database for any category of information and can generate corresponding written reports on any such subject. By such reports, the board can better target its activities. For example, the board can search the database to determine which listed properties have not been shown often and then suggest to the member agencies that the advertising of these properties be increased. Similarly, the board can monitor manpower trends and suggest staffing schedules that allocate agency personnel to the offices and at the time that the demand is greatest. The use of multitasking in super microcomputer 100' allows such searches and reports to be performed in the "background" while highly interactive tasks, such as word processing, are done in "foreground."

The Level Four system offers many advantages to real estate boards that span large territories. For example, the agent keys 14' are usually programmed to expire periodically and must be rejuvenated. This is desirably done by the real estate board so as to maintain control over key usage. Accordingly, most data communicator units (resident at agencies) are not enabled to rejuvenate expired keys. The agents could travel to the board offices periodically to have their keys rejuvenated, but in large metropolitan areas this may be burdensome. The Level Four system allows the agent to complete all such transactions with the board over telephone lines. To rejuvenate an expired key, the agent would insert the key in the nest 70' of the data communicator unit 20' and invoke the appropriate routine in the single board computer 66'. This routine would instruct the data communicator/pod assembly modem 108' to call the board computer, exchange the appropriate handshaking signals and receive from the board computer the signals needed to rejuvenate the key resting in the nest.

As noted in the auxiliary permission code discussion above, the board computer 100' contains all auxiliary permission codes used in the system and updates them, by the encrypted algorithm, on the preset periodic basis. This listing agent who needs to know an updated auxiliary permission code can dial the board computer and identify himself or herself by a unique password code. This password code can be entered by Touch Tones on a conventional Touch Tone phone. The board computer, through a voice synthesizer 118', can then recite the new auxiliary password for that agent's listing. Any other agent who wishes to see the house must first obtain this auxiliary code from the listing agent.

The board computer 100' desirably has a modem 120' and an outgoing phone line 122' with which it can communicate with the vendor. Updated software can be reloaded using this link. Other diagnostic routines, such as deciphering an audit trail contained in a lockbox or key, can be effected by the vendor using this link to the local board office.

The board computer includes several security measures. For example, all requests for service to the computer must include proper password codes before any transactions can take place. Certain particularly sensitive transactions may require that a user call the computer, send the appropriate password codes, and then hang up, allowing the computer to call the user back on a predetermined telephone line. With these and other techniques, security of the system is maintained against intruders, even if the security of the password codes is breached.

As can be seen from the above discussion, the addition of computer 100' and its associated equipment in the Level Four system greatly increases the system's utility, and provides large real estate boards with a versatile, comprehensive and integrated lockbox management system.

Having illustrated and described the principles of our invention with reference to a preferred embodiment and several variations thereof, it should be apparent to those skilled in the art that the invention can be modified in arrangement and detail without departing from such principles. For example, although the system is described with reference to a lockbox system for containing dwelling keys, it is readily adaptable to other uses, such as in industrial security systems. Similarly, although the preferred embodiment has been described as including all the claimed features, other systems could readily be designed that include only some of these features and that include other features not here discussed. Accordingly, we claim as our invention all such modifications as may come within the spirit and scope of the following claims and equivalents thereof.

We claim:

1. In an electronic key for use with an electronic lock, the key and lock being distinct from one another and movable relative thereto, the key including a microprocessor, a battery coupled to the microprocessor, a memory coupled to the microprocessor, a keypad including at least the digits 0–9, the keypad being coupled to the microprocessor, and a communications port for sending signals to the lock, an improvement comprising:

a receiver for receiving electromagnetic radio frequency signals; and a decoder coupled to the receiver for providing data corresponding to a received radio frequency signal to the memory to change data stored therein;

wherein characteristics of the key can be programmed remotely and wherein the characteristics stored in memory include a code representing an expiration date for said key.

* * * * *